(12) United States Patent
Lee et al.

(10) Patent No.: US 11,860,484 B2
(45) Date of Patent: Jan. 2, 2024

(54) LIQUID CRYSTAL ELEMENT

(71) Applicant: OSAKA UNIVERSITY, Osaka (JP)

(72) Inventors: Sunri Lee, Suita (JP); Giichi Shibuya, Suita (JP); Hiroyuki Yoshida, Suita (JP); Masanori Ozaki, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 229 days.

(21) Appl. No.: 17/620,349

(22) PCT Filed: Jun. 18, 2019

(86) PCT No.: PCT/JP2019/024083
§ 371 (c)(1),
(2) Date: Dec. 17, 2021

(87) PCT Pub. No.: WO2020/255248
PCT Pub. Date: Dec. 24, 2020

(65) Prior Publication Data
US 2022/0365383 A1    Nov. 17, 2022

(51) Int. Cl.
| G02F 1/1339 | (2006.01) |
| G02F 1/1337 | (2006.01) |
| G02F 1/1343 | (2006.01) |
| G02F 1/29   | (2006.01) |

(52) U.S. Cl.
CPC ........ *G02F 1/13394* (2013.01); *G02F 1/1337* (2013.01); *G02F 1/13398* (2021.01); *G02F 1/134381* (2021.01); *G02F 1/294* (2021.01)

(58) Field of Classification Search
CPC ........... G02F 1/13394–13398; G02F 1/134381
See application file for complete search history.

(56) References Cited

U.S. PATENT DOCUMENTS

| 8,891,034 B2 | 11/2014 | Takane et al. |
| 8,953,109 B2 | 2/2015 | Takama et al. |
| 9,158,120 B2 | 10/2015 | Takama et al. |
| 10,095,081 B2 | 10/2018 | Shibuya et al. |
| 10,598,961 B2 | 3/2020 | Shibuya et al. |
| 10,761,245 B2 | 9/2020 | Shibuya et al. |

(Continued)

FOREIGN PATENT DOCUMENTS

| CN | 107357110 A | 11/2017 | |
| EP | 2565707 A1 * | 3/2013 | ......... G02F 1/13394 |

(Continued)

OTHER PUBLICATIONS

Sunri Lee et al., "Improvement of Phase Contrast in Liquid Crystal Fresnel Lens with Segmented Structure", 27th International Liquid Crystal Conference (ILCC2018), Jul. 22-27, 2018, Kyoto, Japan.

(Continued)

*Primary Examiner* — Mariceli Santiago
(74) *Attorney, Agent, or Firm* — Studebaker & Brackett PC

(57) ABSTRACT

A liquid crystal element (100) includes a plurality of unit electrodes (10), a liquid crystal layer (LQ), and a plurality of wall members (WL). Each of the unit electrodes (10) includes a first electrode (1) and a second electrode (2). A voltage is applied to the liquid crystal layer (LQ) from each of the unit electrodes (10). The wall members (WL) are arranged in the liquid crystal layer (LQ). The liquid crystal layer (LQ) has a waveform retardation (RT). Two or more of a plurality of peaks (P1) in the retardation (RT) correspond to positions of respective wall members (WL).

9 Claims, 25 Drawing Sheets

(56) References Cited

U.S. PATENT DOCUMENTS

| | | |
|---|---|---|
| 2009/0244411 A1 | 10/2009 | Takane et al. |
| 2012/0218490 A1 | 8/2012 | Takama et al. |
| 2014/0168547 A1 | 6/2014 | Takama et al. |
| 2018/0031947 A1 | 2/2018 | Shibuya et al. |
| 2018/0356652 A1 | 12/2018 | Shibuya et al. |
| 2019/0187339 A1 | 6/2019 | Shibuya et al. |
| 2020/0355853 A1 | 11/2020 | Shibuya et al. |

FOREIGN PATENT DOCUMENTS

| | | | |
|---|---|---|---|
| JP | 2005274668 A | * 10/2005 | ....... G02F 1/133555 |
| JP | 2010-134981 A | 6/2010 | |
| JP | 2012-173715 A | 9/2012 | |
| JP | 2018-101026 A | 6/2018 | |
| JP | 2019-002977 A | 1/2019 | |
| WO | 2016/117604 A1 | 7/2016 | |
| WO | 2018/016390 A1 | 1/2018 | |

OTHER PUBLICATIONS

Sunri Lee et al., The Poster of "Improvement of Phase Contrast in Liquid Crystal Fresnel Lens with Segmented Structure", 27th International Liquid Crystal Conference (ILCC2018), Jul. 23, 2018.

Marenori Kawamura, "Development of electronic control refractive index distribution type liquid crystal lens array and its application", New Technology Presentation Meetings!, Mar. 7, 2019, p. 1-p. 18.

International Search Report; issued in PCT/JP2019/024083; dated Aug. 13, 2019.

"Notice of Reasons for Refusal" Office Action issued in JP 2021-528095; mailed by the Japanese Patent Office dated Aug. 23, 2022.

* cited by examiner

LIQUID CRYSTAL ELEMENT

TECHNICAL FIELD

The present invention relates to a liquid crystal element.

BACKGROUND ART

A liquid crystal lens array disclosed in Patent Literature 1 includes a pattern electrode layer, a ground electrode layer, a liquid crystal layer, and erected sections. The pattern electrode layer includes a first pattern electrode layer and a second pattern electrode layer. The erecting section protrudes from a substrate including the ground electrode layer toward the pattern electrode layer and into the liquid crystal layer. The erected sections are conductive. Patent Literature 1 also discloses, as a preferable example, that the surface of each erected section is a weak anchoring surface. A weak anchoring surface is a surface on which constraining force (alignment regulating force) acting on liquid crystal molecules is weaker than on a surface of an alignment film forming the liquid crystal layer.

In the liquid crystal lens array, the potential of an electrode on a low-potential side does not substantially increase because the erected sections block influence of a leaking electric field from an electrode on a high-potential side. Accordingly, the maximum value of optical phase difference increases and the optical phase difference (corresponding to retardation) approximates linearity as a deflection angle increases.

CITATION LIST

Patent Literature

Patent Literature 1

Japanese Patent Application Laid-Open Publication No. 2018-101026

SUMMARY OF INVENTION

Technical Problem

However, in the liquid crystal lens array disclosed in Patent Literature 1, the relationship between the erected sections and optical phase difference is not clear. For example, the minimum value of optical phase difference may be thought to be positioned correspondingly to one of mutually adjacent erected sections, and the maximum value of optical phase difference may be thought to be positioned correspondingly to the other one of the mutually adjacent erected sections.

By contrast, the inventors of the present application have discovered through diligent research that as the width of unit electrodes including first electrodes and second electrodes narrows in a liquid crystal element with a waveform retardation, an amplitude difference in the waveform retardation attenuates correspondingly to electrodes with a narrow width.

The object of the present invention is to provide a liquid crystal element capable of inhibiting attenuation of the amplitude difference in a waveform retardation.

Solution to Problem

A liquid crystal element according to an aspect of the present invention includes a plurality of unit electrodes, a liquid crystal layer, and a plurality of wall members. Each of the unit electrodes includes a first electrode and a second electrode. A voltage is applied to the liquid crystal layer from each of the unit electrodes. The wall members are arranged in the liquid crystal layer. The liquid crystal layer has a waveform retardation. Two or more of a plurality of peaks in the retardation correspond to positions of respective wall members.

In the liquid crystal element of the present invention, it is preferable the wall members have surfaces constituted by a polymer, a material with a polar element, or a polymer with a polar element.

In the liquid crystal element of the present invention, directors of liquid crystal molecules making contact with the wall members among liquid crystal molecules constituting the liquid crystal layer are preferably oriented in a direction along an interface of the liquid crystal layer.

In the liquid crystal element of the present invention, the wall members preferably have an anchoring energy of $1 \times 10^{-6}$ ($J/m^2$) or greater.

In the liquid crystal element of the present invention, the wall members each are preferably opposite to an area between a corresponding first electrode of the first electrodes and a corresponding second electrode of the second electrodes, the corresponding first electrode and the corresponding second electrode constituting a unit electrode of the unit electrodes.

In the liquid crystal element of the present invention, the wall members each are preferably opposite to an area between unit electrodes of the unit electrodes.

In the liquid crystal element of the present invention, the wall members each are preferably opposite to either a corresponding one of the first electrodes or a corresponding one of the second electrodes.

In the liquid crystal element of the present invention, the wall members preferably extend from a side of one interface to a side of another interface of the liquid crystal layer.

In the liquid crystal element of the present invention, the unit electrodes are preferably arranged concentrically with respect to an optical axis. The farther outward in a radial direction from the optical axis a unit electrode among the unit electrodes is positioned, the smaller a width of the unit electrode is. The wall members are preferably arranged correspondingly to unit electrodes, of the unit electrodes, positioned outward of a prescribed position in the radial direction.

Advantageous Effects of Invention

According to the present invention, a liquid crystal element capable of inhibiting attenuation of the amplitude difference in a waveform retardation can be provided.

DESCRIPTION OF EMBODIMENTS

Figure 1A:
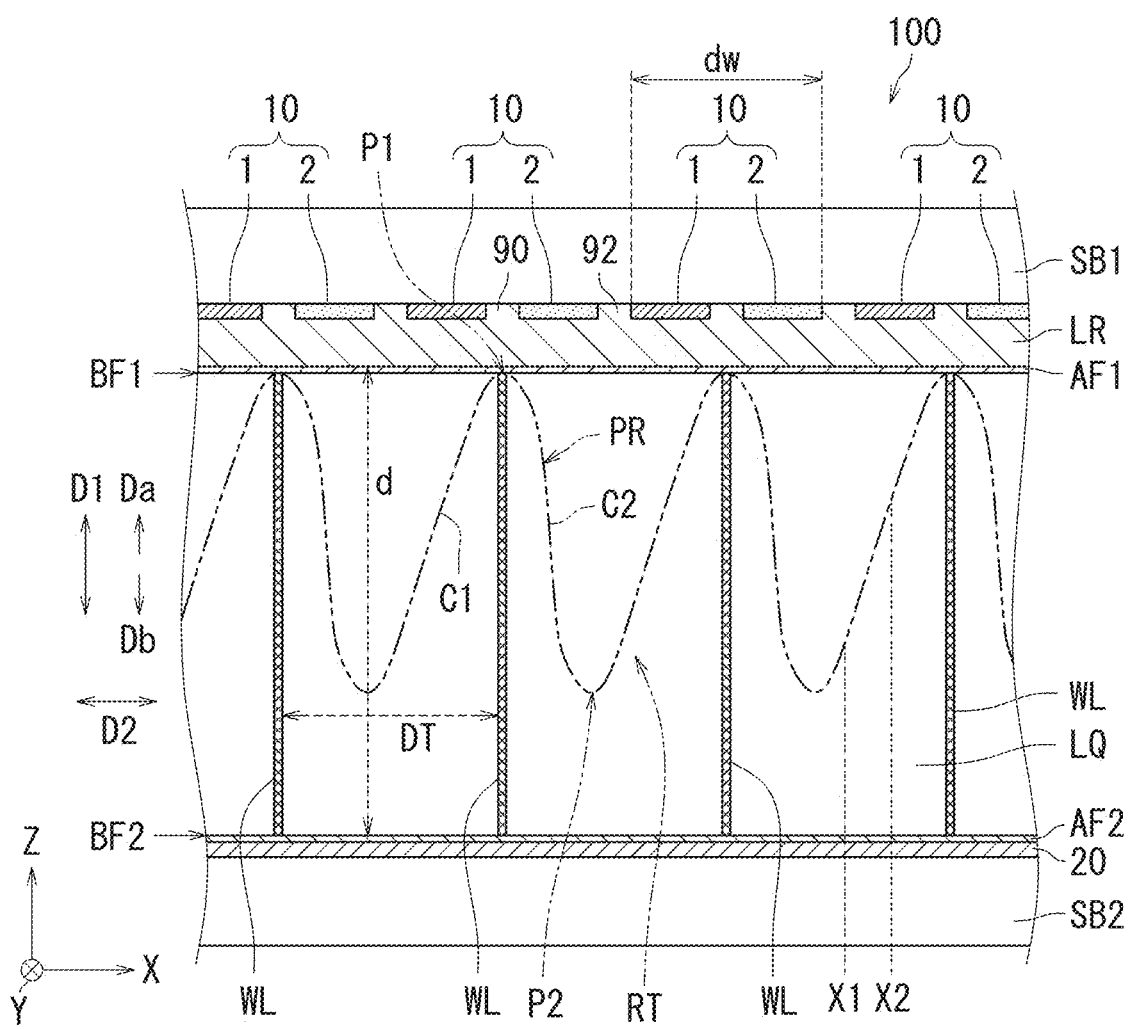
FIG. 1A is a cross-sectional view of a liquid crystal element (V1<V2) according to a first embodiment of the present invention.

The following describes embodiments of the present invention with reference to the accompanying drawings. Note that elements that are the same or equivalent are labeled with the same reference signs in the drawings and description thereof is not repeated. Furthermore, in the embodiments of the present invention, X, Y, and Z axes of a three-dimensional orthogonal coordinate system are appropriately added to facilitate understanding of the drawings. Note that diagonal lines indicating cross-sections are appropriately omitted to simplify the drawings.

First Embodiment

A liquid crystal element 100 according to a first embodiment of the present invention is described with reference to FIGS. 1A to 3D. The liquid crystal element 100 can function as a liquid crystal lens, for example. For example, the liquid crystal element 100 functioning as a liquid crystal lens can be used as a lens of an optical device. Examples of the optical device include an eyeglass, a head-mounted display, an endoscope, and a camera, but the application of the liquid crystal element 100 is not particularly limited.

FIG. 1A is a cross-sectional view of the liquid crystal element 100. As illustrated in FIG. 1A, the liquid crystal element 100 includes a substrate SB1, a plurality of unit electrodes 10, an insulating layer LR, an alignment film AF1, a liquid crystal layer LQ, an alignment film AF2, a counter electrode 20, a plurality of wall members WL, and a substrate SB2. The counter electrode 20 corresponds to an example of an "electrode".

The unit electrodes 10, the insulating layer LR, the alignment film AF1, the liquid crystal layer LQ, the alignment film AF2, the counter electrode 20, and the wall members WL are arranged between the substrate SB1 and the substrate SB2. The insulating layer LR, the alignment film AE1, the liquid crystal layer LQ, the alignment film AF2, and the wall members WL are arranged between the unit electrodes 10 and the counter electrode 20.

The insulating layer LR and the alignment film AF1 are arranged between the unit electrodes 10 and the liquid crystal layer LQ. The alignment film AF1 is arranged on an interface BF1 of the liquid crystal layer LQ. The interface BF1 indicates a surface of the liquid crystal layer LQ on a side of the unit electrodes 10. The alignment film AF1 the liquid crystal layer LQ, the alignment film AF2, and the wall members WL are arranged between the insulating layer LR and the counter electrode 20. The alignment film AF2 is arranged on an interface BF2 of the liquid crystal layer LQ. The interface BF2 indicates a surface of the liquid crystal layer LQ on a side of the counter electrode 20, The interfaces BF1 and BF2 are opposite to each other in a first direction D1.

The first direction D1 indicates a direction substantially perpendicular to the unit electrodes 10 and the counter electrode 20. In other words, the first direction D1 is substantially perpendicular to the interfaces BF1 and BF2 of the liquid crystal layer LQ. The first direction D1 includes a direction Da and a direction Db. The direction Da indicates a direction from the side of the counter electrode 20 to the side of the unit electrodes 10. The direction Db is a direction opposite to the direction Da, and indicates a direction from the side of the unit electrodes 10 to the side of the counter electrode 20. A second direction D2 is substantially perpendicular to the first direction D1. In other words, the second direction D2 is substantially parallel to the interfaces BF1 and BF2.

The substrate SB1 is substantially plate-shaped. The substrate SB1 is for example transparent and made of glass or synthetic resin. In the present description, the term "transparent" includes colorless and transparent, colored and transparent, and semi-transparent.

Each of the unit electrodes 10 is arranged in the same layer level. The unit electrodes 10 are arranged with intervals therebetween. Each of the unit electrodes 10 includes a first electrode 1 and a second electrode 2. The first and second electrodes 1 and 2 constituting each unit electrode 10 are arranged with an interval therebetween. Each of the first and second electrodes 1 and 2 is transparent, for example, and is made of indium tin oxide (ITO). Note that each of the first and second electrodes 1 and 2 may for example be formed by a metal mesh such as copper, a layered structure of ITO and metal mesh, a layered structure of conductive carbon black fiber and ITO, or a mixture thereof, and the materials are not particularly limited.

A first voltage V1 is applied to the first electrodes 1. The first electrodes 1 apply the first voltage V1 to the liquid crystal layer LQ. The first voltage V1 is an alternating current voltage. A second voltage V2 is applied to the second electrodes 2. The second electrodes 2 apply the second voltage V2 to the liquid crystal layer LQ. The second voltage V2 is an alternating current voltage. The first voltage V1 and the second voltage V2 are different. In the first embodiment, the effective value of the first voltage V1 and the effective value of the second voltage V2 are different. The frequency of the first voltage V1 and the frequency of the second voltage V2 may be the same or may be different.

The insulating layer LR is an electrical insulator. The insulating layer LR is transparent, for example, and is formed by silicon dioxide ($SiO_2$). Note that the insulating layer LR may be for example formed by an organic thin film or a metal oxide other than silicon dioxide, and the material thereof is not particularly limited.

The alignment film AF1 defines an alignment of liquid crystal molecules in the liquid crystal layer LQ. The alignment film AF1 is transparent, for example, and is a polyimide film.

The liquid crystal layer LQ is constituted by liquid crystal. Accordingly, the liquid crystal layer LQ includes a large number of liquid crystal molecules. The liquid crystal constituting the liquid crystal layer LQ is nematic liquid crystal, for example, and is transparent. Furthermore, in the first embodiment, the alignment of the liquid crystal is a homogenous alignment in an environment with no electric field. The homogenous alignment indicates a state in which directors of the liquid crystal molecules are substantially parallel to the second direction D2. Note that the alignment of the liquid crystal may be a homeotropic alignment in an environment with no electric field. The homeotropic alignment indicates a state in which the directors of the liquid crystal molecules are substantially perpendicular to the second direction D2.

The alignment film AF2 defines an alignment for the liquid crystal molecules in the liquid crystal layer LQ. The alignment film AF2 is transparent, for example, and is a polyimide film.

The counter electrode 20 is opposite to the unit electrodes 10 with the insulating layer LR and the liquid crystal layer LQ therebetween. The counter electrode 20 is a substantially planar electrode. The counter electrode 20 is for example transparent and formed by ITO. A third voltage V3 is applied to the counter electrode 20. The counter electrode 20 applies the third voltage V3 to the liquid crystal layer LQ. For example, the counter electrode 20 is grounded and the third voltage V3 is set to ground potential (0 V).

The substrate SB2 is substantially plate-shaped. The substrate SB2 is for example transparent and formed by glass.

The wall members WL are arranged in the liquid crystal layer LQ. Each of the wall members WL extends in the second direction D2, The wall members WL are substantially parallel to each other. The wall members WL are opposite to respective unit electrodes 10. Each wall member WL is transparent, for example. The wall members WL are constituted by an electrical insulator, a highly resistive material, or an electrical conductor. In the present description, the electrical resistivity of a highly resistive material is greater than the electrical resistivity of an electrical conductor and smaller than the electrical resistivity of an electrical insulator.

For example, the surface resistance of a highly resistive material is at least $5\times10^3$ Ω/sq and no greater than $5\times10^9$ Ω/sq, the surface resistance of an electrical conductor is at least $5\times10^{-1}$ Ω/sq and no greater than $5\times10^2$ Ω/sq, and the surface resistance of an electrical insulator is at least $1\times10^{11}$ Ω/sq and no greater than $1\times10^{15}$ Ω/sq. For another example, the surface resistance of a highly resistive material may be at least $1\times10^2$ Ω/sq and no greater than $1\times10^{11}$ Ω/sq, the surface resistance of an electrical conductor may be at least $1\times10^{-2}$ Ω/sq and no greater than $1\times10^2$ Ω/sq, and the surface resistance of an electrical insulator may be at least $1\times10^{11}$ Ω/sq and no greater than $1\times10^{16}$ Ω/sq. Note that these examples do not limit the surface resistance of a highly resistive material, the surface resistance of an electrical conductor, or the surface resistance of an electrical conductor in the application of the present invention.

Optical characteristics of the liquid crystal element 100 are described with further reference to FIG. 1A. In a state in which the first voltage V1 is applied to the first electrodes 1, the second voltage V2 is applied to the second electrodes 2, and the third voltage V3 is applied to the counter electrode 20, the liquid crystal layer LQ has a waveform retardation RT. "Waveform" indicates a continuous shape in which large and small extreme values are alternately repeated.

In the following, the state in which the first voltage V1 is applied to the first electrodes 1, the second voltage V2 is applied to the second electrodes 2, and the third voltage V3 is applied to the counter electrode 20 may be referred to as a "liquid crystal driving state".

A retardation is an amount indicating the phase difference between two light waves generated by a phenomenon in which light incident on the liquid crystal layer LQ is split into the two waves (ordinary light and extraordinary light, for example) having mutually perpendicular oscillation directions. The retardation is expressed by R=Δn×d. R represents a retardation, Δn represents a double refraction of the liquid crystal layer LQ, and d represents a thickness of the liquid crystal layer LQ. Δn may be changed by a tilt angle of each director of the liquid crystal molecules with respect to the second direction D2. Accordingly, the retardation may also be changed by the tilt angle of each director of the liquid crystal molecules with respect to the second direction D2.

For example, Δn=ne(φ)−no. no represents a refractive index of ordinary light. no is not dependent on an angle of incident light with respect to an optical axis OP. In other words, no is not dependent on an inclination angle φ of the optical axis OP with respect to the second direction D2. The optical axis OP indicates an optical axis of the liquid crystal molecules and is a direction in which light cannot be split even when light is incident to an optically anisotropic liquid crystal. ne(φ) represents a refractive index of extraordinary light. ne(φ) changes according to an angle of the incident light with respect to the optical axis OP. In other words, ne(φ) changes according to the inclination angle φ of the optical axis OP relative to the second direction D2. Accordingly, the retardation also changes according to the inclination angle φ of the optical axis OP of the liquid crystal molecules with respect to the second direction D2. As a result, in the liquid crystal layer LQ in the liquid crystal driving state, for example, the inclination angle φ of the optical axis OP of a plurality of liquid crystal molecules (may be referred to in the following as "a plurality of liquid crystal molecules ML1") positioned in the first direction D1 (Z direction) at an X coordinate X1 differs from the inclination angle φ of the optical axis OP of a plurality of liquid crystal molecules (may be referred to in the following as "a plurality of liquid crystal molecules ML2") positioned in the first direction D1 (Z direction) at another X coordinate X2, and the retardation at the X coordinate X1 differs from the retardation at the X coordinate X2. Note that in this example, the inclination angle φ of the optical axis OP of the liquid crystal molecules ML1 at the X coordinate X1 is the same as the inclination angle φ of the optical axis OP of the liquid crystal molecules ML2 at the X coordinate X2 in the liquid crystal driving state to simplify the description.

For example, the retardation at a given X coordinate X1 can be calculated as follows. That is, at the X coordinate X1 in the liquid crystal layer LQ, the liquid crystal molecules ML1 are present in the first direction D1 (Z direction). In actuality, the inclination angles φ of the optical axes OP of the liquid crystal molecules ML1 are not the same in the liquid crystal driving state. Therefore, the retardation at the X coordinate X1 is calculated by integrating Δn of each liquid crystal molecule ML1 from a thickness 0 to a thickness d.

Note that in the liquid crystal layer LQ, for example, the retardation of a liquid crystal part in which the directors of the liquid crystal molecules are substantially orthogonal to the interface BF1 or BF2 is minimal. For example, in the liquid crystal layer LQ, the retardation of a liquid crystal part in which the directors of the liquid crystal molecules are substantially parallel to the interface BF1 or BF2 is maximal.

In the first embodiment, the waveform retardation RT occurs in the liquid crystal layer LQ by arranging the unit electrodes 10 and applying the first voltage V1 to the first electrodes 1 and applying the second voltage V2 to the second electrodes 2.

As illustrated in FIG. 1A in the first embodiment, a plurality of peaks P1 of the waveform retardation RT correspond to the positions of the respective wall members WL. Therefore, according to the first embodiment, due to the arrangement of the wall members WL in the liquid crystal layer LQ, an amplitude difference (P1−P2) of the waveform retardation RT can be inhibited from attenuating even in a part of the liquid crystal layer LQ corresponding to a unit electrode 10 with a relatively small width dw. As a result, a relatively large refracting angle of light can be realized even in a liquid crystal part of the liquid crystal layer LQ corresponding to a unit electrode 10 with a relatively small width dw.

In the example of FIG. 1A, the peaks P1 of the waveform retardation RT are positioned at the positions of the respective wall members WL. That is, the position of each peak P1 in the second direction D2 (X direction) is substantially the same as the position of a corresponding one of the wall members WL in the second direction D2 (X direction). However, the peak P1 may be positioned in a position near the wall member WL in the second direction D2. For example, a "position near a wall member WL" is a position within a range of ±15% of an interval DT relative to the wall member WL in the second direction D2, preferably a position within a range of ±10% of the interval DT relative to the wall member WL, in the second direction D2, more preferably a position within a range of ±5% of the interval DT relative to the wall member WL in the second direction D2. The interval DT indicates an interval between mutually adjacent wall members WL in the second direction D2. Note that the position of the peak P1 in the first direction D1 (Z direction) is not particularly limited.

Note that as the amplitude difference (P1−P2) of the waveform retardation RT increases, the refracting angle of light increases, By contrast, as the amplitude difference (P1−P2) of the waveform retardation RT decreases, the refracting angle of light decreases. An "amplitude difference" indicates a difference between a peak P1 and an extremum P2 adjacent to the peak P1 in the waveform retardation RT.

The peak P1 indicates a local maximum value in the waveform retardation RT. Accordingly, the size of the peaks P1 may be different or may be the same. Extrema P2 each indicate a local minimum value in the waveform retardation RT. Accordingly, the size of the extrema P2 may be different or may be the same.

The retardation RT can be measured as follows. For example, the liquid crystal element 100 is arranged between orthogonal polarizers. When a transmittance is obtained by measuring a transmission spectrum between the orthogonal polarizers, Δn can be obtained from the transmittance. At the same time, the thickness d of the liquid crystal layer LQ is measured using a thickness measuring instrument. The retardation is calculated by Δn×d. Furthermore, for example, when a cross Nicol observation of the liquid crystal element 100 is made using a polarized light microscope, an interference pattern represents the retardation RT.

Figure 2:
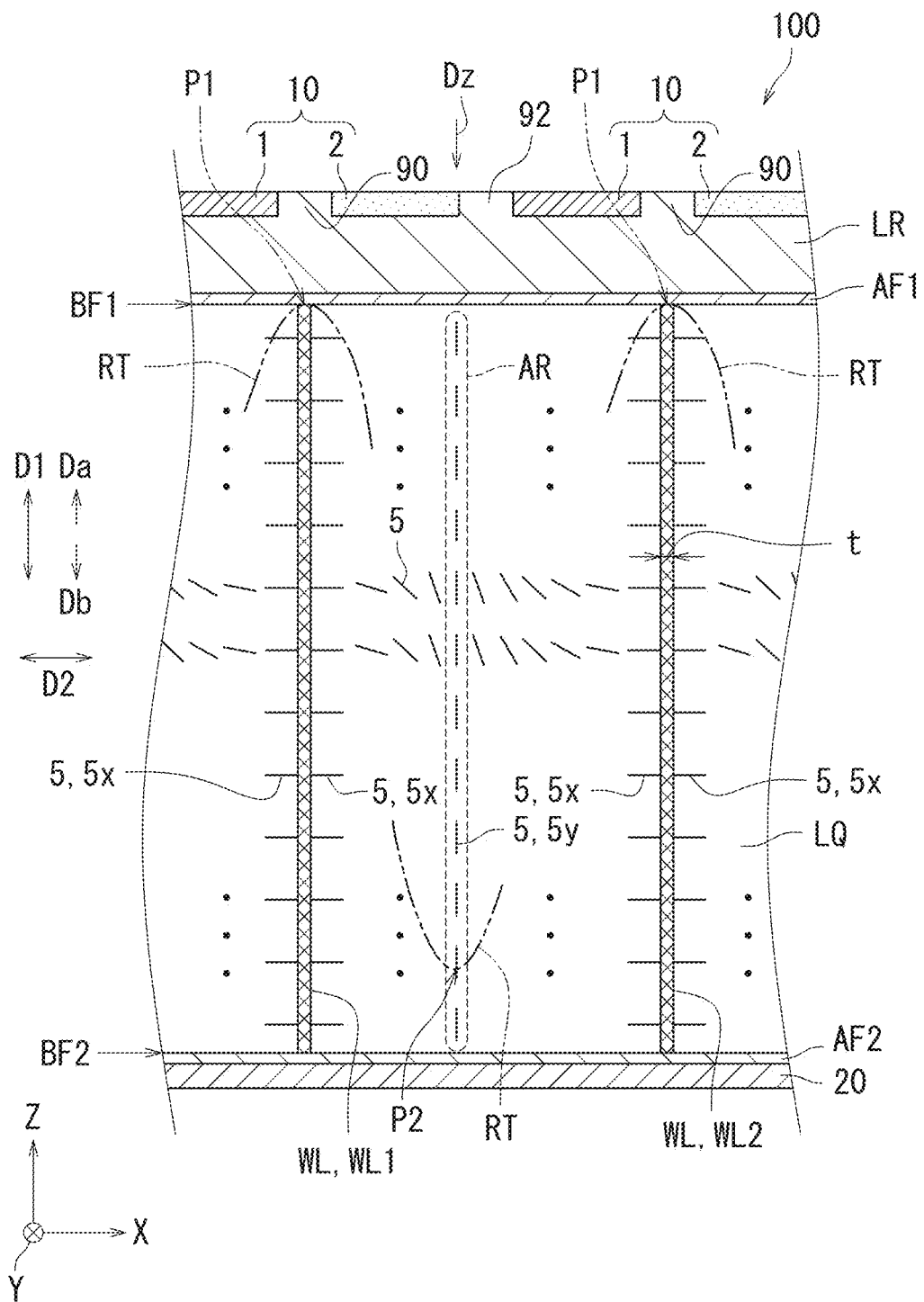
FIG. 2 is a schematic cross-sectional view of a state of liquid crystal molecules included in the liquid crystal element according to the first embodiment.

Next, the retardation RT of the liquid crystal layer LQ is described with reference to FIG. 2. FIG. 2 is a schematic cross-sectional view of a state of liquid crystal molecules 5 included in the liquid crystal layer LQ. In FIG. 2, the first voltage applied to the first electrodes 1 is lower than the second voltage V2 applied to the second electrodes 2. Note that the substrates SB1 and SB2 are omitted front FIG. 2 to simplify the drawing.

As illustrated in FIG. 2, the liquid crystal layer LQ includes a large number of liquid crystal molecules 5. In an area AR between mutually adjacent wall members WL in the liquid crystal layer LQ, the directors of liquid crystal molecules 5y are substantially orthogonal to the interfaces BF1 and BF2 due to application of the second voltage V2, for example. Accordingly, an extremum P2 of the retardation RT occurs in the area AR.

By contrast, the directors of liquid crystal molecules 5x making contact with the wall members WL among the liquid crystal molecules 5 constituting the liquid crystal layer LQ are for example oriented in a direction substantially parallel to the interfaces BF1 and BF2 of the liquid crystal layer LQ. That is, the directors of the liquid crystal molecules 5x making contact with the wall members WL among the liquid crystal molecules 5 constituting the liquid crystal layer LQ are oriented in a direction along the interfaces BF1 and BF2 of the liquid crystal layer LQ. Therefore, according to the first embodiment, each peak P1 of the retardation RT grows large in the position of a corresponding one of the wall members WL. As a result, the amplitude difference of the waveform retardation RT can be inhibited from attenuating.

Note that in a case in which the wall members WL are constituted by an electrical conductor, the directors of the liquid crystal molecules 5x are estimated to be oriented in a direction along the interfaces BF1 and BF2 due to the interaction of the wall members WL, the liquid crystal molecules 5x, and an electric field.

Furthermore, the directors of the liquid crystal molecules 5x making contact with the wall members WL may be oriented in a direction inclined relative to the interfaces BF1 and BF2 as long as the amplitude difference is larger than the amplitude distance of the waveform retardation RT in a case in which the wall members WL are not provided.

Additionally, the liquid crystal molecules 5 in an area of the liquid crystal layer LQ between one wall member WL1 of mutually adjacent wall members WL and the area AR are aligned toward the area AR from the wall member WL1 and gradually change from a laying state to a standing state due to continuity of the liquid crystal molecules 5. Also, the liquid crystal molecules 5 in an area between the area AR and another wall member WL2 are aligned toward the wall member WL2 from the area AR and also gradually change from a laying state to a standing state due to the continuity of the liquid crystal molecules 5. As a result, as illustrated in FIG. 2, the waveform retardation RT with a plurality of peaks P1 and a plurality of extrema P2 occurs.

Particularly, in the first embodiment, the wall members WL extend in the liquid crystal layer LQ from a side of the counter electrode 20 to a side of the unit electrodes 10. Accordingly, the directors of the liquid crystal molecules 5x making contact with the wall members WL are oriented in a direction along the interfaces BF1 and BF2 across the liquid crystal layer LQ from the side of the counter electrode 20 to the side of the unit electrodes 10. As a result, the peaks P1 of the waveform retardation RT grow large and the amplitude difference of the retardation RT can be effectively inhibited from attenuating. In the example in FIG. 2, the wall members WL extend from the interface BF2 to the interface BF1 of the liquid crystal layer LQ.

Note that the directors of the liquid crystal molecules 5 can be measured as follows. For example, the alignment or order parameter of the liquid crystal is directly observed by polarized Raman spectroscopy or polarized infrared spectroscopy. For another example, the direction of refractive index anisotropy or dielectric anisotropy is observed as an indirect optical method.

Furthermore, a thickness t of each wall member WL is preferably as thin as possible. This is so that light passing through the liquid crystal layer LQ can be inhibited from receiving direct influence from the wall members WL. The thickness t of each wall member WL indicates a thickness of the wall member WL in the second direction D2. The thickness t of the wall member WL is for example preferably smaller than the width of a first electrode 1 or the width of a second electrode 2. The thickness t of the wall member WL is for example preferably smaller than the width of an area 90 or the width of an area 92. The thickness t of the wall member WL is for example preferably 5 μm or less and more preferably 1 μm or less.

The area 90 indicates an area in the insulating layer LR between a first electrode 1 and a second electrode 2 constituting a unit electrode 10. Note that the area 90 may be a space. The area 92 indicates an area in the insulating layer LR between mutually adjacent unit electrodes 10. Note that the area 92 may also be a space.

In addition, as illustrated in FIG. 1A in the first embodiment, the waveform retardation RT has a plurality of convex parts PR. Each of the convex parts PR is asymmetrical with respect to a corresponding one of the peaks P1. Each of the convex parts PR exhibits an asymmetrical substantial mountain shape, for example. Furthermore, the wall members WL are opposite to the areas 90 of the insulating layer LR in the first direction D1 with the alignment film AF1 therebetween. Accordingly, in a case in which the first voltage V1 applied to the first electrodes 1 is lower than the second voltage V2 applied to the second electrodes 2, each of the convex parts PR includes a gently inclined part C1 and a steeply inclined part C2 with the corresponding peak P1 therebetween. The gently inclined part C1 corresponds to a first electrode 1. The steeply inclined part C2 corresponds to a second electrode 2. The inclination of the gently inclined part C1 is gentler than the inclination of the steeply inclined part C2. In a case in which the first voltage V1 is lower than the second voltage V2, the retardation RT has, for example, a shape in which a substantial backwards N shape is repeated. A case in which the first voltage V1 is higher than the second voltage V2 is described later.

Note that for example, incident light substantially perpendicular to the liquid crystal layer LQ refracts to a side of the gently inclined part C1. In FIG. 1A, for example, incident light substantially perpendicular to the liquid crystal layer LQ refracts diagonally leftward and upward.

Additionally, in the first embodiment, for example, in switching the relative sizes of the first voltage V1 and the second voltage V2 to switch the liquid crystal element 100 functioning as a liquid crystal lens between a convex lens and a concave lens, the size of a focal length (positive value, for example) of the convex lens can be substantially matched to the size of the focal length (negative value, for example) of the concave lens. As a result, convenience is high for a user or a designer of the liquid crystal element 100.

Note that in FIG. 2, the width of the areas 92 of the insulating layer LR is substantially the same as the width of the areas 90. However, the width of the areas 92 and the width of the areas 90 are not particularly limited. For example, by arranging the wall members WL opposite to the areas 90 in a case in which the width of the areas 92 is smaller than the width of the areas 90, formation of the wall members WL is facilitated more than in a case in which the wall members WL are arranged opposite to the areas 92.

Note that even in a case in which the first voltage V1 applied to the first electrodes 1 is higher than the second voltage V2 applied to the second electrodes 2, the waveform retardation RT occurs in a similar manner to a case in which the first voltage V1 is lower than the second voltage V2. Even in this case, the directors of the liquid crystal molecules 5x making contact with the wall members WL are oriented in a direction along the interfaces BF1 and BF2 by anchoring of the wall members WL. Therefore, the peaks P1 of the retardation RT grow large in the positions of the wall members WL. As a result, the amplitude difference in the waveform retardation RT can be inhibited from attenuating. Note that in this case, in an area (referred to in the following as an "area AR1") in the liquid crystal layer LQ between mutually adjacent wall members WL, the directors of the liquid crystal molecules 5y are oriented in a direction substantially orthogonal to the interfaces BF1 and BF2 due to application of the first voltage V1, for example. Accordingly, in the area AR1 in the liquid crystal layer LQ between mutually adjacent wall members WL, an extremum P2 occurs in the retardation RT.

Furthermore, even in a case in which the first voltage V1 is higher than the second voltage V2, the continuity of the liquid crystal molecules 5 between the wall member WL1 and the area AR1 and the continuity of the liquid crystal molecules 5 between the area AR1 and the wall member WL2 are the same as in a case in which the first voltage V1 is lower than the second voltage V2. Accordingly, the waveform retardation RT occurs with a plurality of peaks P1 and a plurality of extrema P2.

Figure 1B:
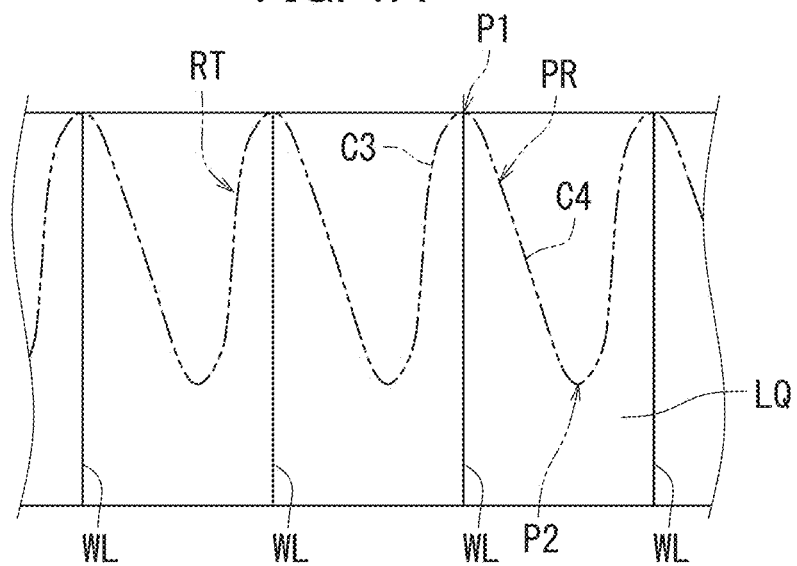
FIG. 1B is a diagram illustrating a retardation of the liquid crystal element (V1>V2) according to the first embodiment.

FIG. 1B is a diagram illustrating the retardation RT in a case in which the first voltage V1 applied to the first electrodes 1 is higher than the second voltage V2 applied to the second electrodes 2. In a case in which the first voltage V1 is higher than the second voltage V2 as illustrated in FIG. 1B, each of the convex parts PR forming the waveform retardation RT includes a steeply inclined part C3 and a gently inclined part C4 with a peak P1 therebetween. This is because in the first embodiment, the wall members WL are opposite to the areas 90 of the insulating layer LR in the first direction D1 with the alignment film AF1 therebetween. The steeply inclined part C3 corresponds to a first electrode 1. The gently inclined part C4 corresponds to a second electrode 2. The inclination of the gently inclined part C4 is gentler than the inclination of the steeply inclined part C3. In a case in which the first voltage V1 is higher than the second voltage V2, the retardation RT has, for example, a shape in which a substantial backwards N shape is repeated.

Note that for example, incident light that is substantially perpendicular to the liquid crystal layer LQ refracts to a side of the gently inclined part C4. In FIG. 1B, for example, incident light substantially perpendicular to the liquid crystal layer LQ refracts diagonally rightward and upward.

Here, anchoring of the wall members WL is alignment restricting force or binding force acting on the liquid crystal molecules 5. That is, the anchoring of the wall members WL is defined in the same manner as the anchoring of the alignment film. The size of the anchoring is for example represented by anchoring energy ($J/m^2$). The liquid crystal molecules 5 are aligned in a direction of an alignment easy axis defined by liquid crystal material and the material of the wall members WL. The anchoring energy is energy required to pull the liquid crystal molecules 5 away from the direction of the alignment easy axis. That is, the anchoring energy is defined in the same manner as anchoring energy provided between the liquid crystal molecules and the alignment film.

For example, the anchoring energy of the wall members WL is preferably at least $1 \times 10^{-6}$ ($J/m^2$). In this preferable example, the wall members WL can ensure adequate anchoring energy to orient the directors of the liquid crystal molecules 5x making contact with the wall members WL in a direction along the interfaces BF1 and BF2.

Note that the anchoring energy can be measured as follows. For example, the anchoring energy can be measured by a saturated threshold voltage method derived from a generalized surface anchoring model.

Next, the material of the wall members WL is illustrated.

For example, the wall surfaces of the wall members WL are constituted by a polymer. Accordingly, because the anchoring energy of the wall members WL is increased by polymer chains, the liquid crystal molecules 5x making contact with the wall members WL are effectively aligned along the interfaces BF1 and BF2 of the liquid crystal layer LQ. As a result, the amplitude difference in the waveform retardation RT can be effectively inhibited from attenuating. The polymer is an electrical insulator or a highly resistive material, for example. An example of the polymer is polyimide. Note that the polymer may be for example an electrical conductor (conductive polymer, for example). Examples of a conductive polymer include polypyrrole and poly(3,4-ethylenedioxythiophene) doped with poly(4-styrene sulfonate) (PEDOT: PSS). Note that the wall members WL may be entirely constituted by a polymer, or only the wall surfaces of the wall members WL may be constituted by a polymer. For example, each wall member WL may be constituted by a wall main body and a polymer film formed on surfaces of the wall main body. In this case, the material of the wall main body is not particularly limited. For example, the wall main body may be an electrical insulator, a highly resistive material, or an electrical conductor.

For example, the wall surfaces of the wall members WL, may be constituted by a substance with a polar element. Accordingly, because the anchoring energy of each wall member WL is increased by the polar element, the liquid crystal molecules 5x making contact with the wall members WL are effectively aligned along the interfaces BF1 and BF2 of the liquid crystal layer LQ. As a result, the amplitude difference in the waveform retardation RT can be effectively inhibited from attenuating. The substance with a polar element is for example an electrical insulator or a highly resistive material. The substance with a polar element is polyimide, for example. Note that the wall members WL may be entirely constituted by a substance with a polis element, or only the wall surfaces of the wall members WL may be constituted by a substance with a polar element. For example, each wall member WL may be constituted by a wall main body and a film of a substance with a polar element formed on surfaces of the wall main body. In this case, the material of the wall main body is not particularly limited. For example, the wall main body may be an electrical insulator, a highly resistive material, or an electrical conductor.

For example, the wall surfaces of the wall members WL may be constituted by a polymer with a polar element. Accordingly, because the anchoring energy of the wall members WL is increased by the polar element and polymer chains, the liquid crystal molecules 5x making contact with the wall members WL are effectively aligned along the interfaces BF1 and BF2 of the liquid crystal layer LQ. As a result, the amplitude difference in the waveform retardation RT can be effectively inhibited from attenuating. The polymer with a polar element is for example an electrical insulator or a highly resistive material. An example of the polymer with a polar element is polyimide. Note that the wall members WL may be entirely constituted by a polymer with a polar element, or only the wall surfaces of the wall members WL may be constituted by a polymer with a polar element. For example, each wall member WL may be constituted by a wall main body and a polymer film with a polar element formed on surfaces of the wall main body. In this case, the material of the wall main body is not particularly limited. For example, the wall main body may be an electrical insulator, a highly resistive material, or an electrical conductor.

Next, an example of a manufacturing method of the wall members WL is described. Light is radiated into a solution of liquid crystal (biphenyl liquid crystal, for example) and photocurable liquid crystalline monomer for polymerization of the monomer to form the wall members WL as high-density polymer network structures. Specifically, when a liquid crystal/liquid crystalline monomer solution is interposed between substrates with an attached polyimide alignment film, the liquid crystal and the liquid crystalline monomer with an elongated molecular structure are spontaneously aligned. Thereafter, polymer is selectively precipitated and cured on the irradiated portion through ultraviolet pattern exposure. As such, the monomer in an area not irradiated with ultraviolet rays undergoes thermal diffusion or concentration diffusion toward and captured in the irradiated portion, and therefore agglomerates of polymer grow on the substrate surfaces to construct polymer walls as the wall members WL. As such, the wall members WL are constituted by a polymer formed from a photocurable liquid crystalline monomer. For example, inside of the wall members WL, photocurable liquid crystalline monomers are aligned. Accordingly, the liquid crystal molecules 5 making contact with the wall members WL are aligned along the alignment of the photocurable liquid crystalline monomers. In other words, the alignment of the liquid crystal molecules 5 making contact with the wall members WL can be defined by an initial alignment state of the photocurable liquid crystalline monomer.

Note that for example the wall members WL may be produced using nanoimprint lithography (photoimprint or thermal imprint, for example) or photolithography. For example, in a case in which the wall members WL are each constituted by an electrical insulator, the wall members WL may be constituted by photopolymerizable resin. For example, in a case in which the wall members WL are each constituted by an electrical conductor, the wall members WL are created by adding or filling conductive particles to or in semiconductive resin or by dispersing carbon black fibers in semiconductive resin.

For another example, a specific treatment may be performed on the surfaces of the wall members WL. Examples of the specific treatment include hydrophobing treatment, hydrophiling treatment, and plasma treatment. By performing the specific treatment on the surfaces of the wall members WL, intermolecular interaction is strengthened and the liquid crystal molecules 5 easily permeate the wall members WL. As a result, adequate anchoring energy to orient the directors of the liquid crystal molecules 5 making contact with the wall members WL in a direction along the interfaces BF1 and BF2 can be ensured.

Next, a pre-twist angle of the liquid crystal molecules 5 is described with reference to FIGS. 3A to 3D, The pre-twist angle is an angle formed by the long axis of the liquid crystal molecules 5 with respect to a reference line BL when the liquid crystal molecules 5 are viewed in plan. In the present description, "viewed in plan" indicates an object being viewed from the first direction D1. The pre-twist angle is defined by the alignment films AF1 and AF2.

FIGS. 3A to 3D are diagrams illustrating a state of the liquid crystal molecules 5 making contact with a wall member WL. In FIGS. 3A to 3D, the wall member WL and the liquid crystal molecules 5 are viewed from a direction Dz in FIG. 2.

Figure 3A:
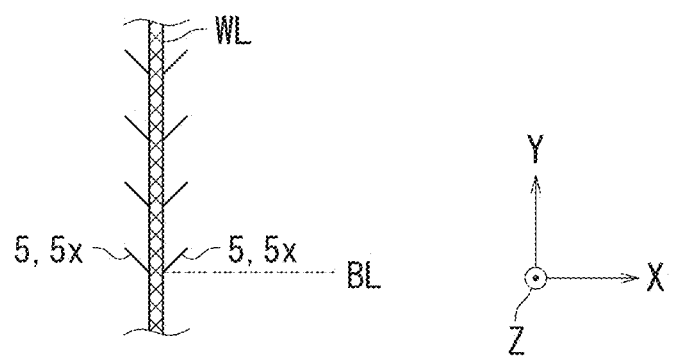
FIG. 3A is a diagram illustrating a state of liquid crystal molecules (pre-twist angle: 45 degrees) making contact with a wall member of the liquid crystal element according to the first embodiment.

In a first example as illustrated in FIG. 3A, the pre-twist angle formed by the long axis of the liquid crystal molecules 5 with respect to the reference line BL is 45 degrees. The reference line BL is substantially perpendicular to the wall member WL.

Figure 3B:
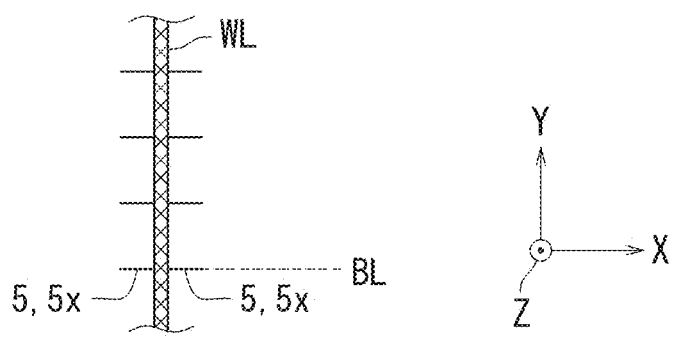
FIG. 3B is a diagram illustrating a state of the liquid crystal molecules (pre-twist angle: 0 degrees) making contact with the wall member of the liquid crystal element according to the first embodiment.

In a second example as illustrated in FIG. 3B, the pre-twist angle formed by the long axis of the liquid crystal molecules 5 with respect to the reference line BL is 0 degrees.

Figure 3C:
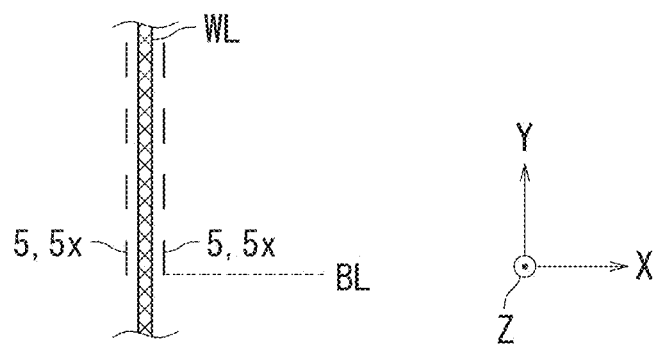
FIG. 3C is a diagram illustrating a state of the liquid crystal molecules (pre-twist angle: 90 degrees) making contact with the wall member of the liquid crystal element according to the first embodiment.

In a third example as illustrated in FIG. 3C, the pre-twist angle formed by the long axis of the liquid crystal molecules 5 with respect to the reference line BL is 90 degrees.

Figure 3D:
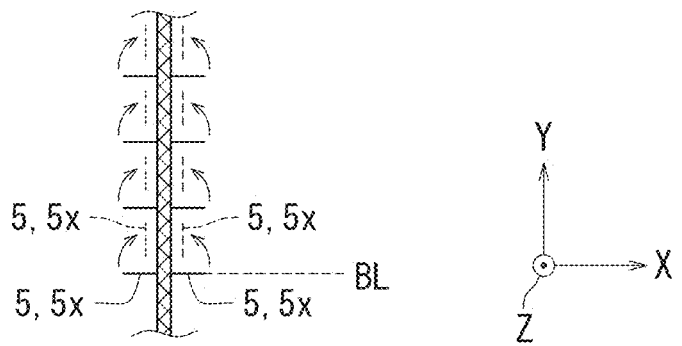
FIG. 3D is a diagram illustrating a state of the liquid crystal molecules (pre-twist angle: 0 degrees to 90 degrees) making contact with the wall member of the liquid crystal element according to the first embodiment.

In a fourth example as illustrated in FIG. 3D, the pre-twist angle formed by the long axis of the liquid crystal molecules 5 in the alignment film AF2 relative to the reference line BL is 0 degrees. In addition, the pre-twist angle formed by the long axis of the liquid crystal molecules 5 in the alignment film AF1 with respect to the reference line BL is 90 degrees. Accordingly, a plurality of liquid crystal molecules 5 are arranged so as to twist between the alignment film AF1 and the alignment film AF2.

The present invention can be applied independent of the pre-twist angle of the liquid crystal molecules 5. This is because the retardation RT increases as the directors of the liquid crystal molecules 5 approach the direction along the interfaces BF1 and BF2 (direction parallel to the interfaces BF1 and BF2) of the liquid crystal layer LQ but is independent of the pre-twist angle of the liquid crystal molecules 5. For example, as long as the directors of the liquid crystal molecules 5x making contact with the wall member WL are oriented in the direction along the interfaces BF1 and BF2 of the liquid crystal layer LQ, the amplitude difference in the waveform retardation RT can be inhibited from attenuating independent of the pre-twist angle of the liquid crystal molecules 5.

Next, first to fifth variations of the first embodiment are described with reference to FIGS. 4A to 8. In the first to third variations, the arrangement of the wall members WL mainly differs from that of the first embodiment as described with reference to FIGS. 1A to 2. In the fourth and fifth variations, the length of the wall members WL mainly differs from that of the first embodiment as described with reference to FIGS. 1A to 2. In the following, points of difference between the first to fifth variations and the first embodiment are mainly described.

First Variation

Figure 4A:
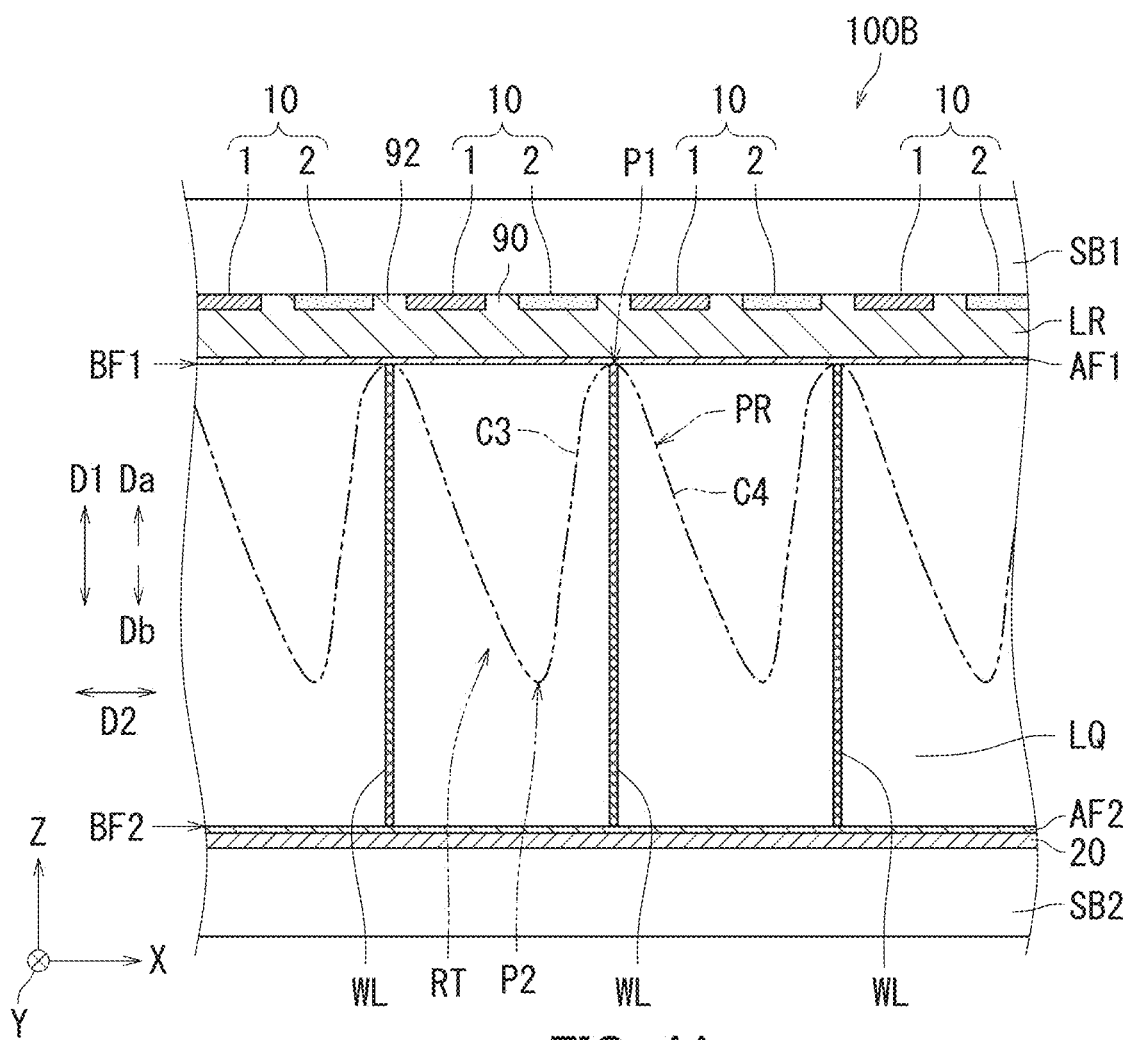
FIG. 4A is a cross-sectional view of a liquid crystal element (V1<V2) according to a first variation of the first embodiment of the present invention.

FIG. 4A is a cross-sectional view of a liquid crystal element 100B according to the first variation. In the first variation as illustrated in FIG. 4A, the wall members WL are opposite to areas 92 between mutually adjacent unit electrodes 10 in the first direction D1 with the alignment film AF1 therebetween. Accordingly, in a case in which the first voltage V1 applied to the first electrodes 1 is lower than the second voltage V2 applied to the second electrodes 2, each of the convex parts PR composing the waveform retardation RT includes a steeply inclined part C3 and a gently inclined part C4 with a peak P1 therebetween. That is, the convex parts PR have a shape that is opposite with respect to left and right to the shape of the convex parts PR illustrated in FIG. 1A of the first embodiment. In a case in which the first voltage V1 is lower than the second voltage V2, the retardation RT has, for example, a shape in which a substantial N shape is repeated.

Figure 4B:
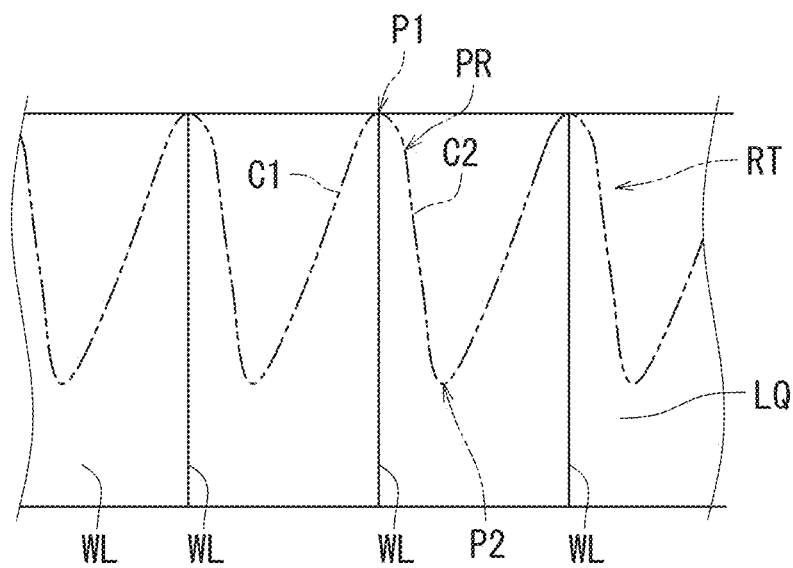
FIG. 4B is a diagram illustrating a retardation of the liquid crystal element (V1>V2) according to the first variation.

FIG. 4B is a diagram illustrating the retardation RT in a case in which the first voltage V1 applied to the first electrodes 1 is higher than the second voltage V2 applied to the second electrodes 2. In a case in which the first voltage V1 is higher than the second voltage V2 as illustrated in FIG. 4B, each of the convex parts PR constituting the waveform retardation RT includes a gently inclined part C1 and a steeply inclined part C2 with a peak P1 therebetween. That is, the convex parts PR have a shape that is opposite with respect to left and right to the convex parts PR illustrated in FIG. 1B of the first embodiment. In a case in which the first voltage V1 is higher than the second voltage V2, the retardation RT has, for example, a shape in which a substantial backwards N shape is repeated.

Second Variation

Figure 5:
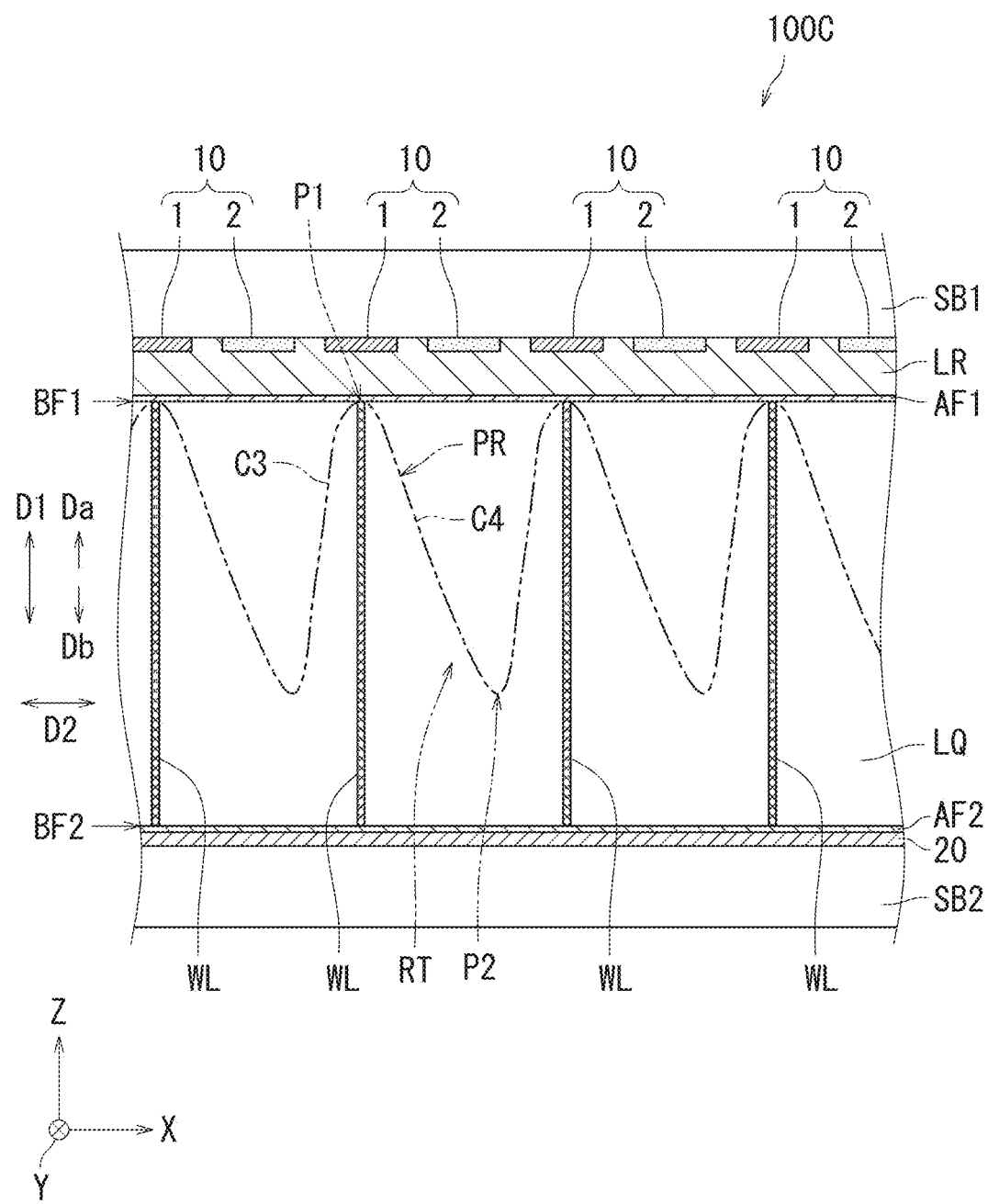
FIG. 5 is a cross-sectional view of a liquid crystal element according to a second variation of the first embodiment of the present invention.

FIG. 5 is a cross-sectional view of a liquid crystal element 100B according to the second variation. In the second variation as illustrated in FIG. 5, the wall members WL are opposite to the first electrodes 1 in the first direction D1 with the alignment film AF1 therebetween. In addition, the first voltage V1 applied to the first electrodes 1 is lower than the second voltage V2 applied to the second electrodes 2. Accordingly, each of the convex parts PR constituting the waveform retardation RT includes a steeply inclined part C3 and a gently inclined part C4 with a peak P1 therebetween. In a case in which the first voltage V1 is lower than the second voltage V2, the retardation RT has for example a shape in which a substantial N shape is repeated.

Third Variation

Figure 6:
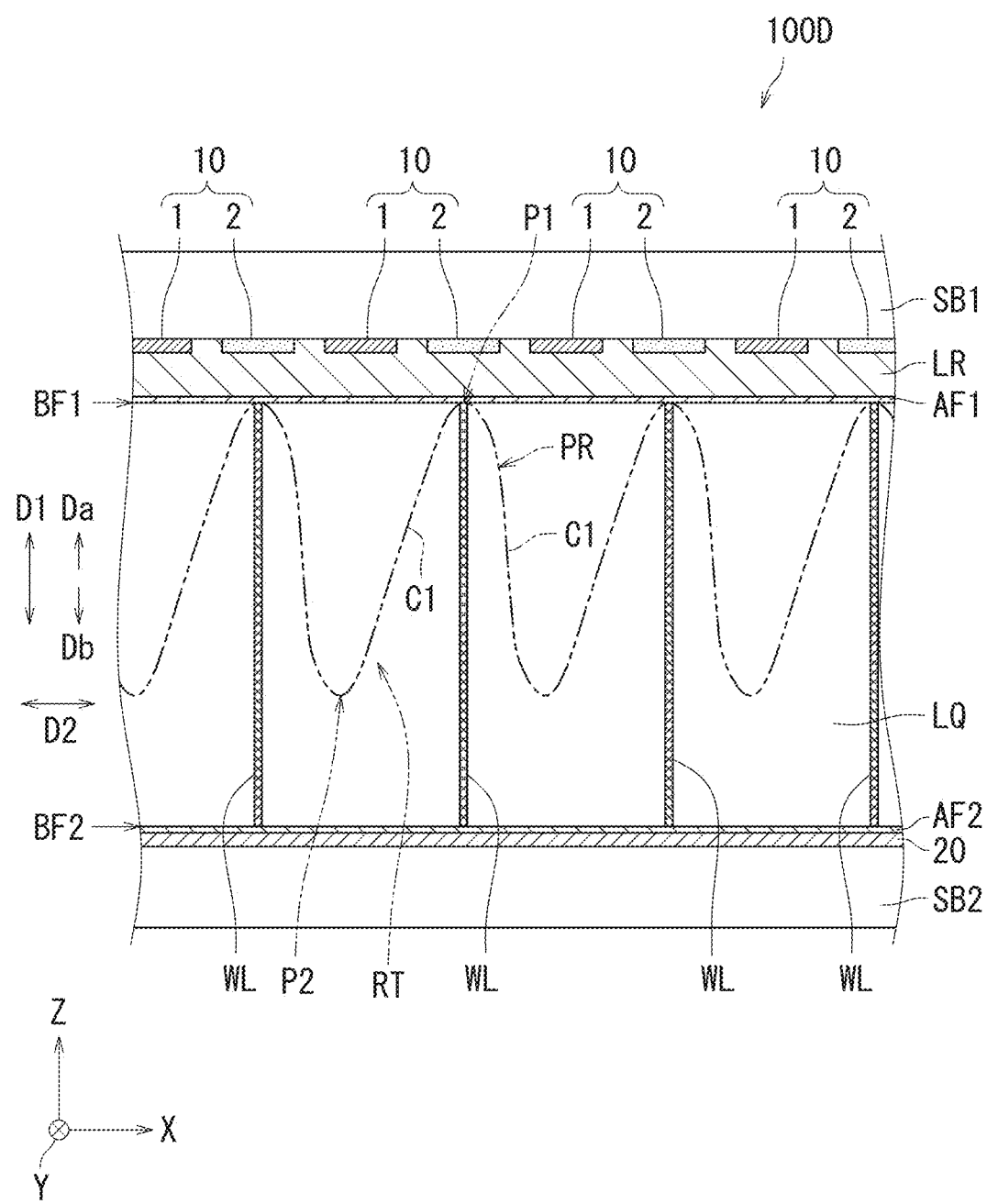
FIG. 6 is a cross-sectional view of a liquid crystal element according to a third variation of the first embodiment of the present invention.

FIG. 6 is a cross-sectional view of a liquid crystal element 100D according to the third variation. In the third variation as illustrated in FIG. 6, the wall members WL are opposite to the second electrodes 2 in the first direction D1 with the alignment film AF1 therebetween. In addition, the first voltage V1 applied to the first electrodes 1 is lower than the second voltage V2 applied to the second electrodes 2. Accordingly, each of the convex parts PR constituting the waveform retardation RT includes a gently inclined part C1 and a steeply inclined part C2 with a peak P1 therebetween. In a case in which the first voltage V1 is higher than the second voltage V2, the retardation RT has for example a shape in which a substantial backwards N shape is repeated.

Fourth Variation

Figure 7:
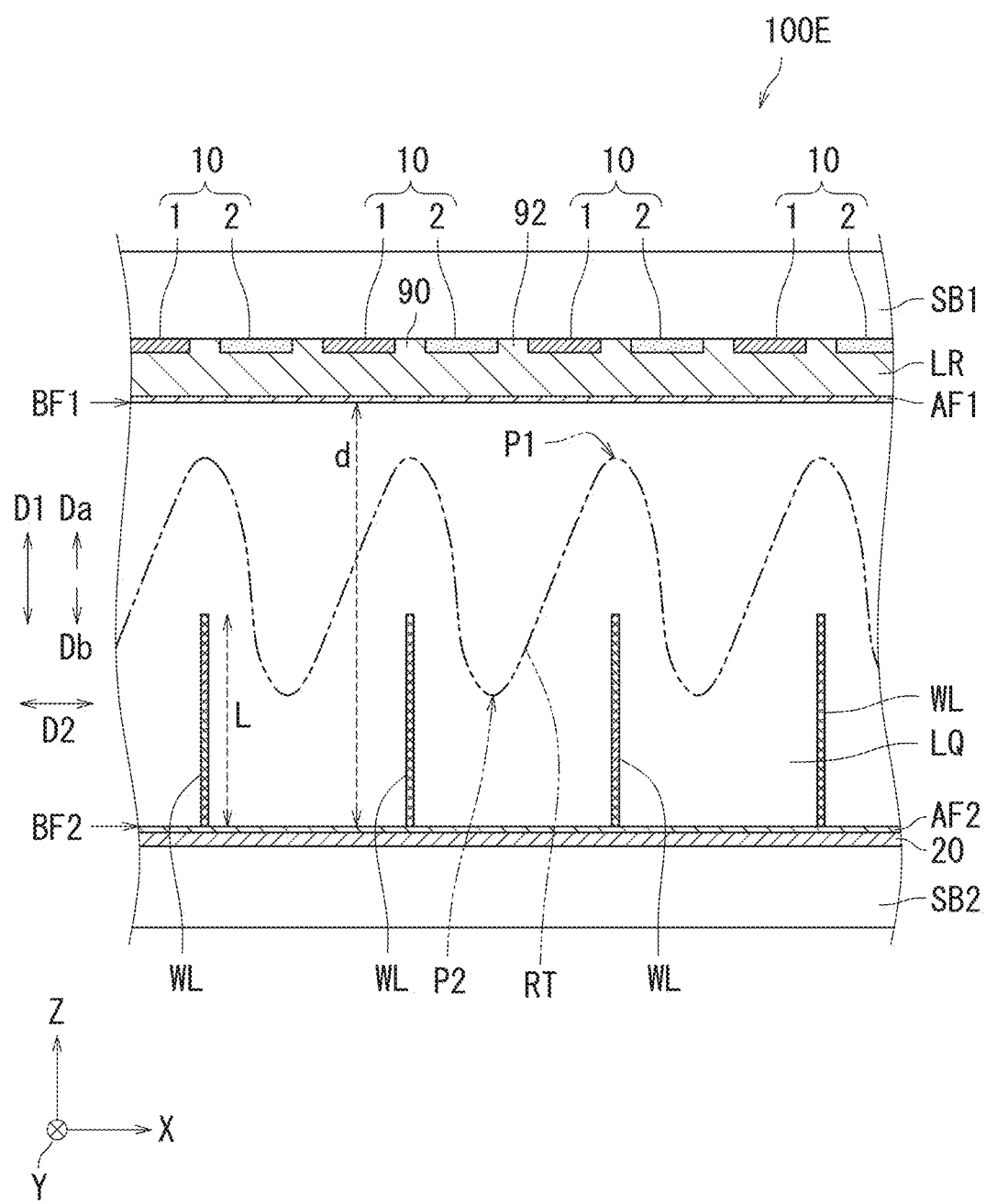
FIG. 7 is a cross-sectional view of a liquid crystal element according to a fourth variation of the first embodiment of the present invention.

FIG. 7 is a cross-sectional view of a liquid crystal element 100E according to the fourth variation. As illustrated in FIG. 7, a length L of the wall members WL is shorter than the thickness d of the liquid crystal layer LQ. The length L indicates a length of the wall members WL in the first direction D1. The wall members WL extend in the direction Da from the side of the counter electrode 20 toward the side of the unit electrodes 10. The wall members WL are opposite to the unit electrodes 10. Specifically, the wall members WL are opposite to the areas 90.

In the fourth variation, by shortening the length L of the wall members WL, light passing through the liquid crystal layer LQ can be inhibited from receiving direct influence from the wall members WL.

Fifth Variation

Figure 8:
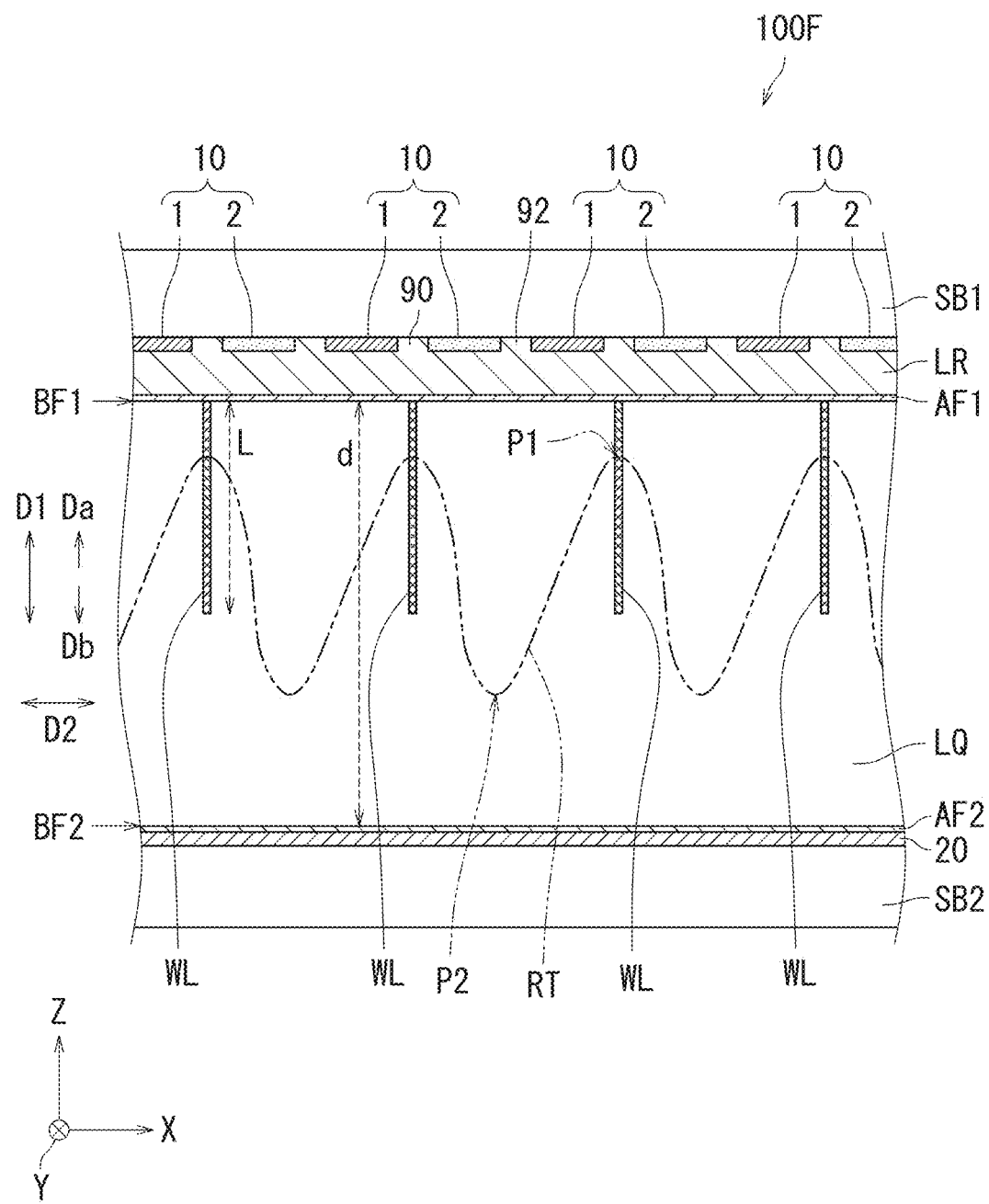
FIG. 8 is a cross-sectional view of a liquid crystal element according to a fifth variation of the first embodiment of the present invention.

FIG. 8 is a cross-sectional view of a liquid crystal element 100F according to the fifth variation. As illustrated in FIG. 8, the length L of the wall members WL is shorter than the thickness d of the liquid crystal layer LQ. The length L indicates a length of the wall members WL in the first direction D1. The wall members WL extend in the direction Db from the side of the unit electrodes 10 toward the side of the counter electrode 20. The wall members WL are opposite to the unit electrodes 10. Specifically, the wall members WL are opposite to the areas 90.

In the fifth variation, by shortening the length L of the wall members WL, light passing through the liquid crystal layer LQ can be inhibited from receiving direct influence from the wall members WL.

Note that in the fourth and fifth variations, the wall members WL may be opposite to the areas 92, the first electrodes 1, or the second electrodes 2.

In the first embodiment and the first to fifth variations, the liquid crystal elements 100 and 100A to 100F may include a highly resistive layer (resistive layer) constituted by a highly resistive material instead of the insulating layer LR. Furthermore, the present invention is applicable as long as the liquid crystal elements 100 and 100A to 100F include unit electrodes 10, a liquid crystal layer LQ, and wall members WL. The structure of the liquid crystal elements 100 and 100A to 100F is not particularly limited. In the same manner, the present invention can be applied without particular limitation imposed on any specific structure of the unit electrodes 10, the liquid crystal layer LQ, or the wall members WL.

Second Embodiment

Next, a liquid crystal element 1000 according to a second embodiment of the present invention is described with reference to FIG. 9. The second embodiment mainly differs from the first embodiment in that in the second embodiment, the liquid crystal element 1000 includes highly resistive layers 30. In the following, differences between the second embodiment and the first embodiment are mainly described.

Figure 9:
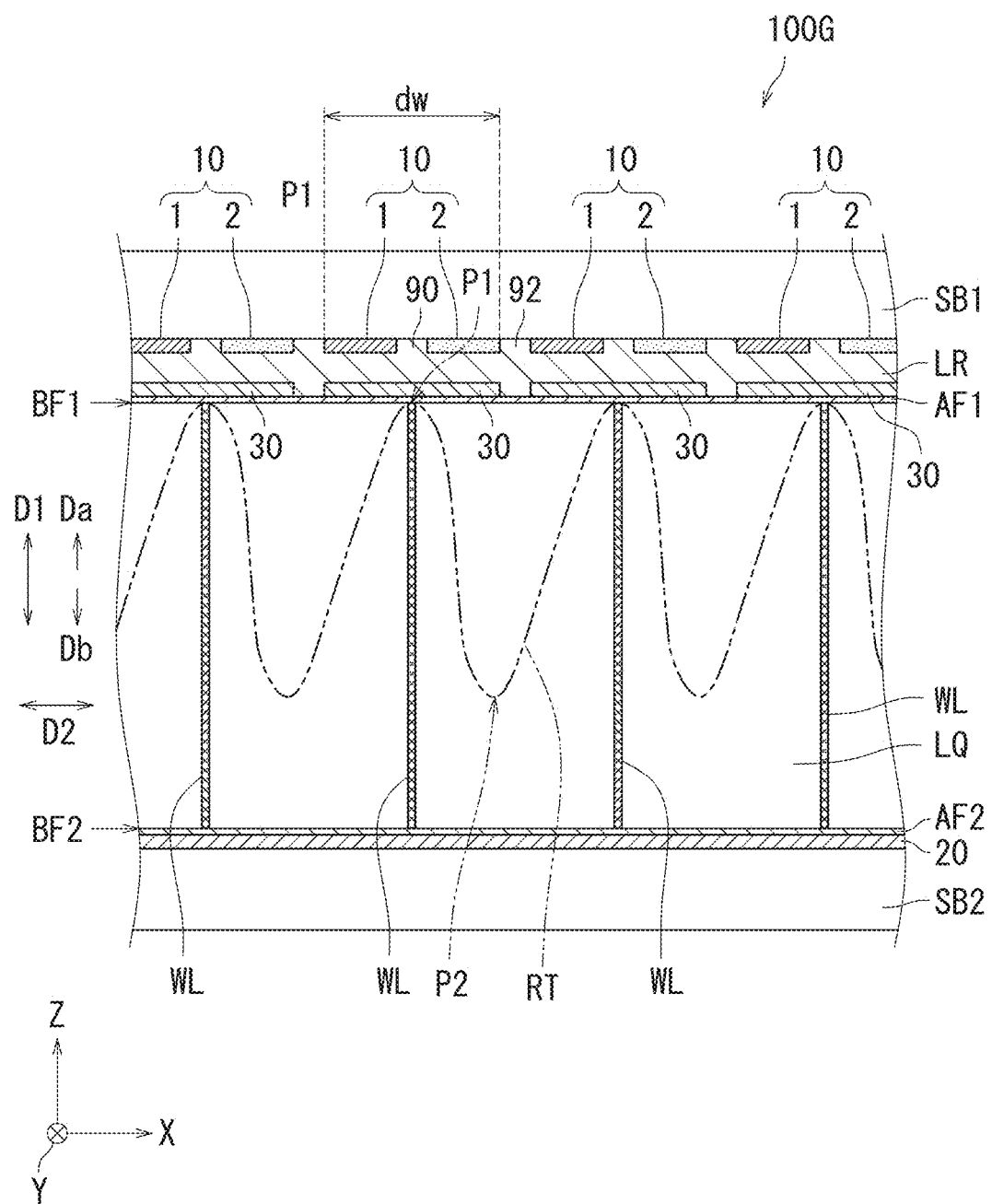
FIG. 9 is a cross-sectional view of a liquid crystal element according to a second embodiment of the present invention.

FIG. 9 is a cross-sectional view of the liquid crystal element 1000 according to the second embodiment. The liquid crystal element 1000 includes a plurality of highly resistive layers 30 (resistive layers) in addition to the configuration of the liquid crystal element 100 according to the first embodiment described with reference to FIG. 1A. The highly resistive layers 30 are each constituted by a highly resistive material (resistive element). Accordingly, electrical resistivity of the highly resistive layers 30 is higher than electrical resistivity of an electrical conductor and lower than electrical resistivity of an electrical insulator.

Each of the highly resistive layers 30 is arranged in the same layer level. The highly resistive layers 30 are arranged between the unit electrodes 10 and the liquid crystal layer LQ. In other words, the unit electrodes 10 and the highly resistive layers 30 sandwich the insulating layer LR. The highly resistive layers 30 are opposite to respective unit electrodes 10 in the first direction D1 with the insulating layer LR therebetween. The wall members WL are opposite to the highly resistive layers 30 in the first direction D1 with the alignment film AF1 therebetween. The wall members WL are opposite to the areas 90 in the first direction D1 with the alignment film AF1 and the highly resistive layers 30 therebetween. For example, the highly resistive layers 30 are transparent and made of zinc oxide (ZnO). Note that the material of the highly resistive layers 30 is not particularly limited as long as the highly resistive layers 30 are constituted by a highly resistive material. For example, the highly resistive layers 30 may each be a mixture of zinc oxide and another material, or may each be an organic thin film.

In the second embodiment, when the first voltage V1 is applied to the first electrodes 1 and the second voltage V2 is applied to the second electrodes 2, a smooth potential gradient is formed in the liquid crystal layer LQ because the highly resistive layers 30 are provided. As a result, light incident to the liquid crystal element 100G can be refracted with high precision at a refracting angle corresponding to the potential gradient. Specifically, a set of substantially serrated potential gradients is formed correspondingly to the unit electrodes 10 in the liquid crystal layer LQ. The substantially serrated potential gradients are constituted by a plurality of straight and curved potential gradients, and each potential gradient has a smooth straight or curved shape.

In addition, in the second embodiment, a plurality of wall members WL is included in the same manner as in the first embodiment. Accordingly, in the second embodiment as well as in the first embodiment, the amplitude difference (P1−P2) of the waveform retardation RT can be inhibited from attenuating even a part of the liquid crystal layer LQ corresponding to a unit electrode 10 with a relatively small width dw. Otherwise, the liquid crystal element 100G according to the second embodiment has the same effects as the liquid crystal element 100 according to the first embodiment. Note that characteristics of the shape of the retardation RT of the liquid crystal element 100G are the same as characteristics of the shape of the retardation RT of the liquid crystal element 100 according to the first embodiment (FIGS. 1A and 1B). Note that FIG. 9 illustrates an example in which the first voltage V1 is lower than the second voltage V2.

Note that in the first to fifth variations described with reference to FIGS. 4A to 8, the liquid crystal elements 100B to 100F may each include a plurality of highly resistive layers 30. For example, the wall members WL are opposite to the first electrodes 1 or the second electrodes 2 in the first direction D1 with the highly resistive layers 30 therebetween. Note that even in a case in which the liquid crystal elements 100B to 100F include a plurality of highly resistive layers 30, the characteristics of the shape of each retardation RT are the same as the characteristics of the shape of the retardation RT in a case in which the highly resistive layers 30 are not present.

In the second embodiment, the structure of the liquid crystal element 100G is an example. As long as the liquid crystal element 100G includes the unit electrodes 10, the liquid crystal layer LQ, and the wall members WI, the present invention is applicable and the structure of the liquid crystal element 100G is not particularly limited. In the same manner, the present invention can be applied without particular limitation imposed on any specific structure of the unit electrodes 10, the liquid crystal layer LQ, or the wall members WL.

Third Embodiment

Figure 10:
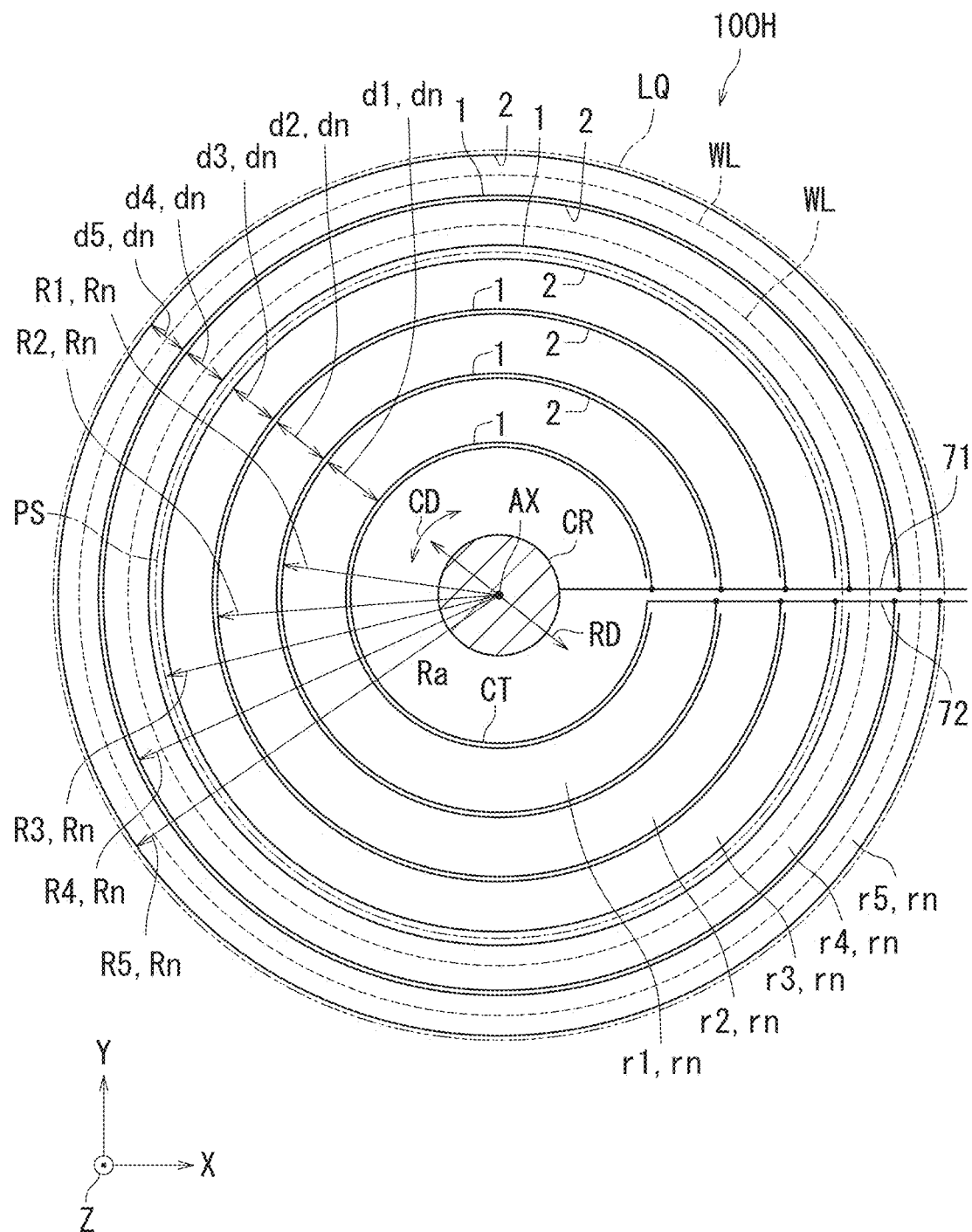
FIG. 10 is a schematic plan view of a liquid crystal element according to a third embodiment of the present invention.
Figure 11:
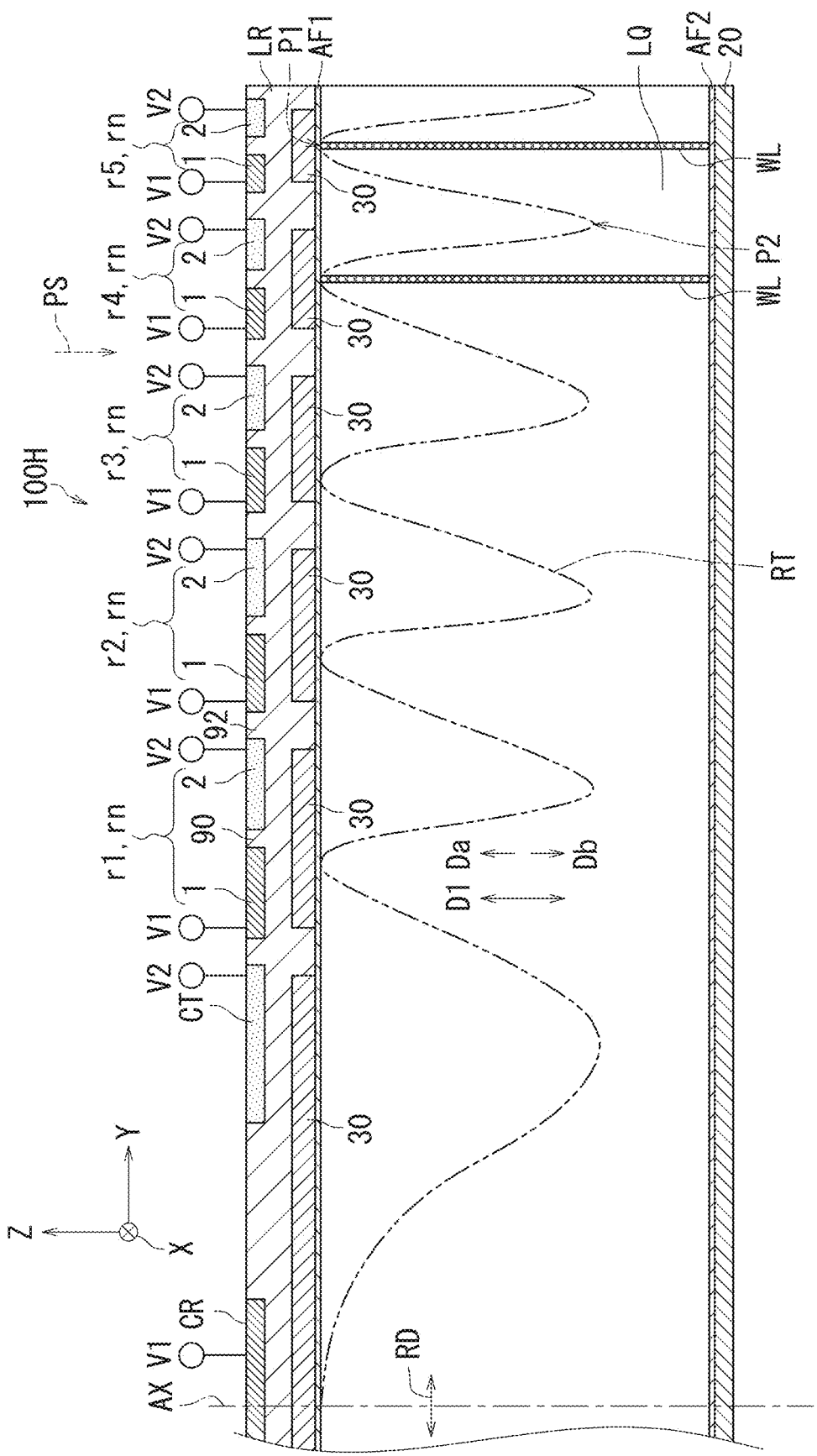
FIG. 11 is a cross-sectional view of the liquid crystal element according to the third embodiment.

The following describes a liquid crystal element 100H according to a third embodiment of the present invention with reference to FIGS. 10 and 11. The third embodiment differs from the second embodiment in that in the third embodiment, the liquid crystal element 100H constitutes a liquid crystal lens (specifically, a Fresnel lens). In the following, differences between the third embodiment and the second embodiment are mainly described.

FIG. 10 is a schematic plan view of the liquid crystal element 100H according to the third embodiment. As illustrated in FIG. 10, the liquid crystal element 100H has an optical axis AX. The optical axis AX corresponds to an optical axis of the liquid crystal element 100H functioning as a liquid crystal lens. Specifically, the optical axis AX is an imaginary straight line passing through a center and focal point of the liquid crystal element 100H functioning as a liquid crystal lens. That is, the optical axis AX matches a rotational axis of symmetry of the liquid crystal element 100H functioning as a liquid crystal lens, and is an imaginary straight line perpendicular to the liquid crystal element 100H.

The liquid crystal element 100H includes a liquid crystal layer LQ, a core electrode CR, a center electrode CT, a plurality of unit electrodes rn, a plurality of wall members WL, a first lead wire 71, and a second lead wire 72. Each of the unit electrodes rn includes a first electrode 1 and a second electrode 2. Note that in FIG. 10, the center electrode CT, the first electrodes 1, the second electrodes 2, the wall members WL, the first lead wire 71, and the second lead wire 72 are illustrated in simplified form.

The suffix n of the reference sign "rn" labeling the unit electrodes rn is an integer from 1 to N assigned to each of the unit electrodes in an order from a unit electrode with the smallest radius to an electrode with the largest radius among the unit electrodes. In the example in FIG. 10, the liquid crystal element 100H includes five unit electrodes rn, and so N is "5".

Each of the unit electrodes rn has a radius Rn. The suffix n of the reference sign "Rn" corresponds to the suffix n of the reference sign "rn". In the liquid crystal element 100H, the farther outward in the radial direction RD a unit electrode rn among the unit electrodes rn is positioned, the larger the radius Rn of the unit electrode rn is (R5>R4>R3>R2>R1). Note that in the third embodiment, the radius Rn of the unit electrode rn indicates a distance from the optical axis AX to the second electrode 2 constituting the unit electrode rn.

The core electrode CR, the center electrode CT, and the unit electrodes rn are arranged substantially concentrically with respect to the optical axis AX. The farther outward in the radial direction RD from the optical axis AX a unit electrode rn among the unit electrodes rn is positioned, the smaller the width dn of the unit electrode rn is. The suffix n of the reference sign "dn" corresponds to the suffix n of the reference sign "rn". The width dn indicates a width of a unit electrode rn in the radial direction RD.

The core electrode CR is disc-shaped and is arranged on the optical axis AX of the liquid crystal element 100H. The core electrode CR is made of the same material as the first electrode 1. The core electrode CR applies the first voltage V1 to the liquid crystal layer LQ.

The center electrode CT surrounds the core electrode CR. The unit electrodes rn are arranged farther outward in the radial direction RD than the center electrode CT. The center electrode CT applies the second voltage V2 to the liquid crystal layer LQ. The center electrode CT is made of the same material as a second electrode 2.

The center electrode CT, the first electrodes 1, and the second electrodes 2 are substantially ring-shaped. In the example in FIG. 10, the center electrode CT, the first electrodes 1, and the second electrodes 2 are each substantially ring-shaped with a partial interruption. Note that each of the first electrodes 1 may be configured to form a substantial ring by a plurality of arc-shaped electrodes. Also, each of the second electrodes 2 may be configured to form a substantial ring by a plurality of arc-shaped electrodes.

The first lead wire 71 is connected to the core electrode CR and the first electrodes 1. The first lead wire 71 applies the first voltage V1 to the core electrode CR and the first electrodes 1.

The second lead wire 72 is connected to the center electrode CT and the second electrodes 2. The second lead wire 72 applies the second voltage V2 to the center electrode CT and the second electrodes 2.

The wall members WL are arranged in substantially concentric circles with respect to the optical axis AX. The wall members WL are substantially ring-shaped as viewed in plan. Note that each of the wall members WL may be configured to form a substantial ring by a plurality of arc-shaped wall members as viewed in plan.

By providing a plurality of wall members WL in the third embodiment, the amplitude difference in the waveform retardation RT can be inhibited from attenuating even in a part of the liquid crystal layer LQ corresponding to a unit electrode rn with a relatively small width dn in the same manner as in the first and second embodiments. Otherwise, the liquid crystal element 100H according to the third embodiment has the same effects as the liquid crystal elements 100 and 100G in the first and second embodiments.

In particular, the wall members WL, are arranged correspondingly to unit electrodes rn positioned farther outward in the radial direction RD than a prescribed position PS (dashed and dotted line) among the unit electrodes rn. That is, the wall members WL are arranged correspondingly to unit electrodes rn positioned outward in the radial direction RD in which attenuation in the amplitude difference in the retardation RT is relatively large. Accordingly, the wall members WL may not be arranged for unit electrodes rn positioned inward in the radial direction RD in which the attenuation of the amplitude difference in the retardation RT is relatively small. As a result, light passing through the liquid crystal layer LQ in an area inside the liquid crystal layer LQ can be inhibited from receiving direct influence from the wall members WL. In other words, the number of the wall members WL can be optimized.

In the third embodiment, the amplitude difference in the retardation RT in the radial direction RD is inhibited from attenuating by the wall members WL in a liquid crystal part of the liquid crystal layer LQ driven by the unit electrodes rn positioned farther outward in the radial direction RD than the prescribed position PS. By contrast, in a liquid crystal part of the liquid crystal layer LQ driven by the unit electrodes rn positioned farther inward in the radial direction RD than the prescribed position PS, attenuation of the amplitude difference in the retardation RT in the radial direction RD does not occur or is minute because the width tin of the unit electrodes rn is relatively large.

That is, according to the third embodiment, adequate amplitude difference in the retardation RT can be ensured for each unit electrode rn across the entire liquid crystal layer LQ by inhibiting attenuation of the retardation RT in the radial direction RD by the wall members WL in a liquid crystal part of the liquid crystal layer LQ driven by the unit electrodes rn positioned farther outward in the radial direction RD than the prescribed position PS. As a result, wave aberration of the liquid crystal element 100H functioning as a liquid crystal lens can be effectively decreased.

In other words, in the third embodiment, the wall members WL are arranged such that the amplitude difference in the retardation RT is substantially constant in a plurality of liquid crystal parts of the liquid crystal layer LQ corresponding to respective unit electrodes rn from inward to outward in the radial direction RD.

Here, the prescribed position PS is a position farther outward than the innermost unit electrode rn in the radial direction RD among the unit electrodes rn. Preferably, the prescribed position PS indicates a position farther outward in the radial direction RD than a position at which the amplitude difference in the retardation RT of liquid crystal parts of the liquid crystal layer LQ driven by each unit electrode rn is substantially constant across two or more unit electrodes rn. Note that in FIG. 10, an interval between a first electrode 1 and a second electrode 2 surrounding a dashed and dotted line indicating the prescribed position PS is illustrated somewhat larger than other parts to facilitate viewing of the diagram.

Next, the liquid crystal element 100H is described with reference to FIG. 11. FIG. 11 is a cross-sectional view of the liquid crystal element 100H. As illustrated in FIG. 11, the liquid crystal element 100H further includes an insulating layer LR, highly resistive layers 30, an alignment film AF1, an alignment film AF2, and a counter electrode 20. The counter electrode 20 corresponds to an example of an "electrode". The highly resistive layers 30 are arranged in a substantially concentric shape with respect to the optical axis AX. Note that the liquid crystal element 100H includes substrates similar to the substrates SB1 and SB2 illustrated in FIG. 1A, but the substrates are omitted to simplify the drawing. In FIG. 11, the effective value of the first voltage V1 is smaller than the effective value of the second voltage V2.

By applying the first voltage V1 to the core electrode CR and the first electrodes 1 and applying the second voltage V2 to the center electrode CT and the second electrodes 2, the waveform retardation RT occurs in the liquid crystal layer LQ. The waveform retardation RT is symmetrical with respect to the optical axis AX. Otherwise, characteristics of the shape of the retardation RT of the liquid crystal element 100H are the same as characteristics of the shape of the retardation RT of the liquid crystal element 100 according to the first embodiment (FIGS. 1A and 1B). Note that FIG. 11 illustrates an example in which the first voltage V1 is lower than the second voltage V2.

Two or more of the peaks P1 in the waveform retardation RT correspond to the positions of respective wall members WL. Specifically, two or more of the peaks P1 of the waveform retardation RT are positioned in the positions of respective wall members WL.

In the example of FIG. 11, the unit electrodes rn positioned farther outward in the radial direction RD than the prescribed position PS are a unit electrode r4 and a unit electrode r5. Accordingly, two of the peaks P1 of the waveform retardation RT respectively correspond to the position of a wall member WL corresponding to the unit electrode r4 and the position of a wall member WL corresponding to the unit electrode r5. Note that the waveform retardation RT has a plurality of extrema P2. Each extremum P2 indicates a local minimum value of the waveform retardation RT.

Furthermore, some of the wall members WL are arranged farther outward in the radial direction RD than the prescribed position PS. Specifically, the wall members WL are arranged opposite to the unit electrodes rn farther outward in the radial direction RD than the prescribed position PS. The wall members WL are opposite to the areas 90 of the insulating layer LR in the first direction D1. Furthermore, in the liquid crystal driving state, the directors of the liquid crystal molecules making contact with the wall members WL are directed in the radial direction RD. That is, in the liquid crystal driving state, the directors of the liquid crystal molecules making contact with the wall members WL are substantially parallel to the radial direction RD. Accordingly, the peaks P1 of the retardation RT can be large at the wall members WL.

According to the third embodiment as described above with reference to FIG. 11, the first voltage V1 is applied to the core electrode CR, the second voltage V2 is applied to the center electrode CT, and the first and second voltages V1 and V2 are applied to the unit electrodes rn. Accordingly, a serrated potential gradient that is symmetrical with respect to the optical axis AX can be formed in the liquid crystal layer LQ. As a result, the liquid crystal element 100H can be made to function as a Fresnel lens.

In particular, the liquid crystal element 100H can form a convex Fresnel lens when the maximum amplitude or the effective value of the second voltage V2 is greater than the maximum amplitude or the effective value of the first voltage V1. By contrast, the liquid crystal element 100H can form a concave Fresnel lens when the maximum amplitude or the effective value of the second voltage V2 is smaller than the maximum amplitude or the effective value of the first voltage V1.

Note that in the third embodiment, the wall members WL may be opposite to the areas 92, the first electrodes 1, or the second electrodes 2 in the first direction D1. Furthermore, the length of the wall members WL is shorter than the thickness d of the liquid crystal layer LQ in the same manner as in the fourth and fifth variations. Moreover, the core electrode CR may not be provided.

In the third embodiment, the structure of the liquid crystal element 100H is an example. As long as the liquid crystal element 100H includes the unit electrodes rn, the liquid crystal layer LQ, and the wall members WL, the present invention is applicable and the structure of the liquid crystal element 100H is not particularly limited. In the same manner, the present invention can be applied without particular limitation imposed on any specific structure of the unit electrodes rn, the liquid crystal layer LQ, or the wall members WL. For example, the unit electrodes rn may be divided in a circumferential direction CD. For another example, the unit electrodes rn may be arranged such that a substantial elliptical is formed. For yet another example, the liquid crystal element 100H may be multifocal. For an additional example, the wall members WL may be arranged and configured in the same manner as in the first to fifth variations described with reference to FIGS. 4A to 8. Even in these cases, the characteristics of the shape of the retardation RT are the same as the characteristics of the shape of the retardation RT in a case in which no highly resistive layers 30 are present. For still another example, the wall members WL may be opposite to the first electrodes 1 or the second electrodes 2 in the first direction D1 with the highly resistive layers 30 therebetween.

Also for example, the wall members WL may be arranged correspondingly to the respective unit electrodes rn. Note that for example, the liquid crystal element 100H may not include the highly resistive layers 30.

In the first embodiment (including variations) to the third embodiment, the color of each element (the wall members WL, the unit electrodes 10 and rn, the insulating layer LR, the highly resistive layers 30, the core electrode CR, the center electrode CT, and the counter electrode 20, for example) constituting the liquid crystal elements 100 and 100A to 100H is not limited to transparent as long as the wall members WL are present, and may be any color.

Next, the present invention is specifically described based on examples, but the present invention is not limited by the following examples.

EXAMPLES

In each of Examples 1 to 19, a retardation RT was calculated by a simulation. In the simulation, software "LCDMaster 2D" (product of SHINTECH Inc.) was used. Furthermore, the electrical resistivity of the insulator was $1 \times 10^9$ ($\Omega$/cm), and the permittivity was 4.00 when the wall members WL were constituted by an electrical insulator. The electrical insulator was silicon dioxide ($SiO_2$). The electrical resistivity of the highly resistive material was $1 \times 10^5$ ($\Omega$/cm) and the permittivity was 8.15 when the wall members WL were constituted by a highly resistive material. The highly resistive material was zinc oxide (ZnO). The electrical resistivity of the electrical conductor was $1.3 \times 10^{-4}$ ($\Omega$/cm) and the permittivity was 3.72 when the wall members WL were constituted by an electrical conductor. The electrical conductor was ITO, The wavelength of incident light was 630 nm. The frequency of both the first voltage V1 and the second voltage V2 was 1 kHz. The pre-twist angle was at an initial value of a twist angle during simulation. The pre-tilt angle was at an initial value of a tilt angle during simulation.

In the following, Examples 1 to 19 are described with reference to FIGS. 12 to 35. In this case, in each of FIGS. 12 and 17, the scale is shown on the horizontal and vertical axes. The horizontal axis indicates a position (μm) in the second direction D2 in the liquid crystal element 100. The vertical axis indicates a position (μm: position in thickness direction) in the first direction D1 in the liquid crystal layer LQ of the liquid crystal element 100. In each of FIGS. 13 to 16, the scales of the horizontal axis and the left side vertical axis are the same as the scale of the horizontal axis and the vertical axis illustrated in FIG. 12, respectively. Furthermore, in each of FIGS. 18 to 32, the scales of the horizontal axis and the left side vertical axis are the same as the scales of the horizontal axis and the vertical axis illustrated in FIG. 17, respectively. Additionally, in each of FIGS. 33 to 35, the scale of the horizontal axis is the same as the scale of the horizontal axis illustrated in FIG. 17. Furthermore, in each of FIGS. 33 to 35, the scale of the left side vertical axis is shown as 0 μm to 15 μm, which differs from the scale (0 μm to 30 μm) of the horizontal axis illustrated in FIG. 17. In addition, in each of FIGS. 13 to 16 and 18 to 35, the right side vertical axis illustrates a retardation (nm).

Furthermore, in FIGS. 13 to 16 and 18 to 35, the liquid crystal molecules 5 are illustrated by "short line segments".

Examples 1 to 3

Liquid crystal elements 100 according to Examples 1 to 3 of the present invention and a liquid crystal element according to Comparative Example 1 are described with reference to FIGS. 12 to 16.

Figure 12:
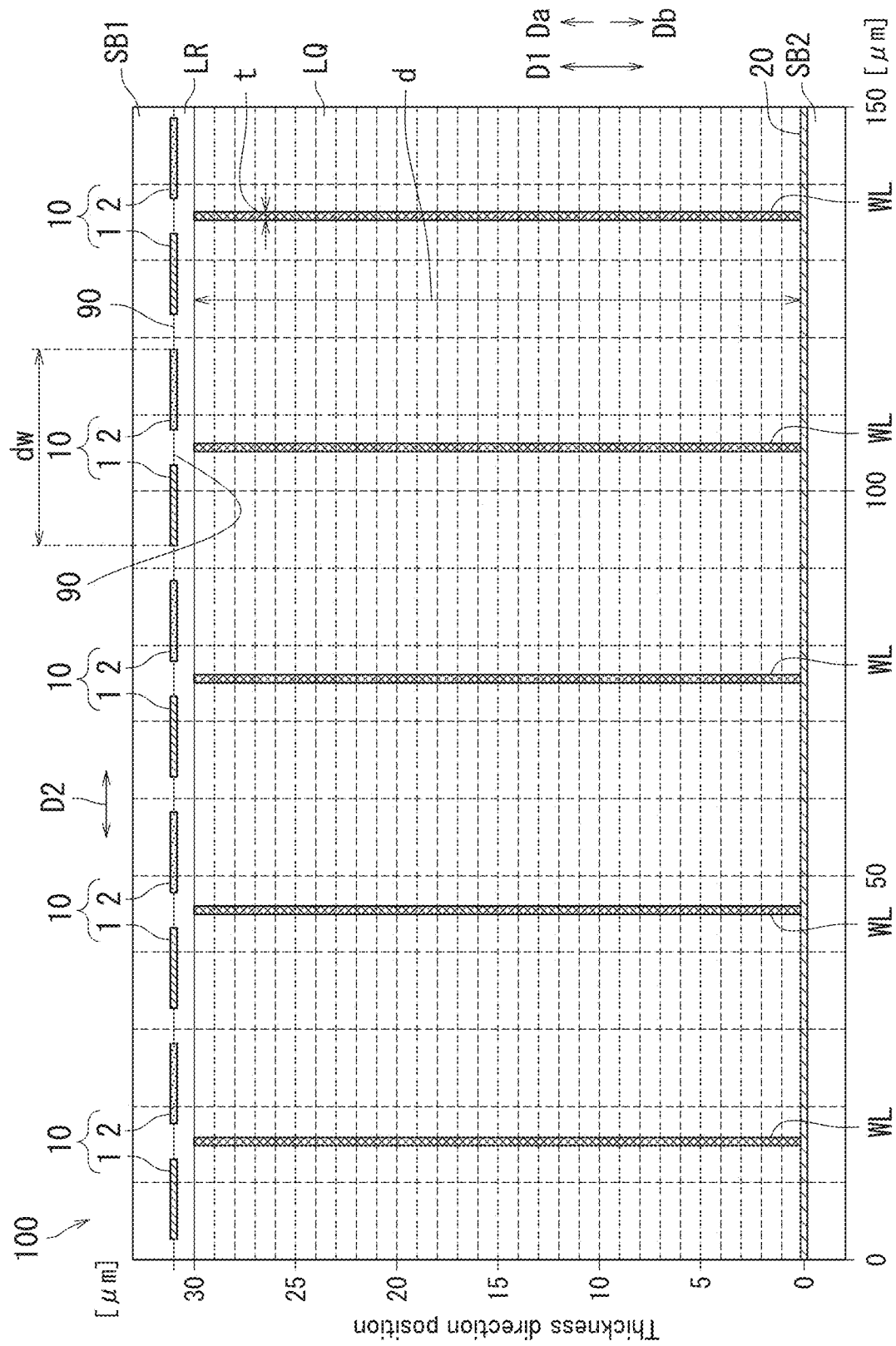
FIG. 12 is a cross-sectional view of a liquid crystal element according to examples of the present invention.

FIG. 12 is a cross-sectional view of a liquid crystal element 100 according to examples of the present invention. As illustrated in FIG. 12, the configuration of the liquid crystal element 100 according to each of the present examples is the same as the configuration of the liquid crystal element 100 according to the first embodiment described with reference to FIG. 1A.

The first voltage V1 applied to the first electrodes 1 was 0.5 V (effective value). The second voltage V2 applied to the second electrodes 2 was 3.0 V (effective value). The pre-twist angle on the alignment films AF1 and AF2 was 45 degrees (refer to FIG. 3A). The pre-tilt angle was 0.1 degree. The thickness d of the liquid crystal layer LQ was 30 μm. The width dw of the unit electrodes 10 was 23 μm. The width of each of the first electrodes 1 and the second electrodes 2 was 10 μm. The thickness t of the wall members WL was 1 μm. The anchoring energy of the wall members WL was $1 \times 10^{30}$ (J/m$^2$).

In each of Examples 1 to 3, the retardation RT was calculated by a simulation under the condition using the liquid crystal element 100 in FIG. 12. The liquid crystal element according to Comparative Example 1 had a configuration in which the wall members WL were removed from the liquid crystal element 100 in FIG. 12. Comparative Example 1 and Examples 1 to 3 are described with reference to FIGS. 13 to 16.

Figure 13:
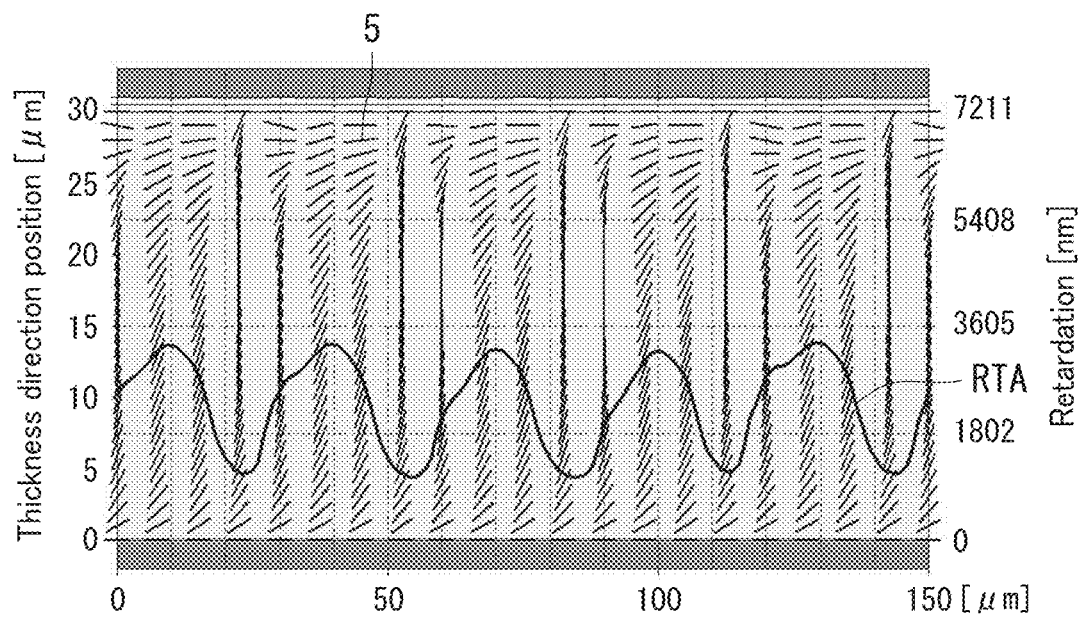
FIG. 13 is a diagram illustrating a retardation of a liquid crystal element according to Comparative Example 1.

FIG. 13 illustrates a retardation RTA of the liquid crystal element according to Comparative Example 1. In the liquid crystal element according to Comparative Example 1 as illustrated in FIG. 13, the amplitude difference in the retardation RTA was approximately 2200 (nm).

Figure 14:
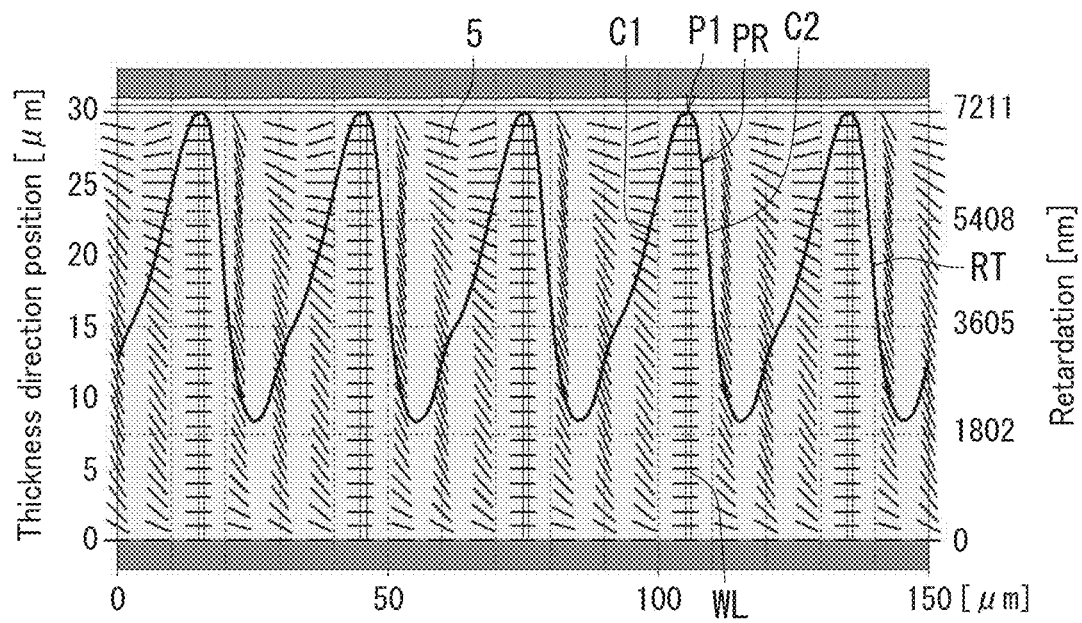
FIG. 14 is a diagram illustrating a retardation of a liquid crystal element including wall members (electrical insulator) according to Example 1 of the present invention.

FIG. 14 illustrates the retardation RT of the liquid crystal element 100 according to Example 1. In Example 1, the material of the wall members WL was an electrical insulator. In the liquid crystal element 100 according to Example 1 as illustrated in FIG. 14, the amplitude difference in the retardation RT was approximately 5000 (nm). Accordingly, in Example 1, the amplitude difference in the retardation RT could be inhibited from attenuating as compared to Comparative Example 1. Furthermore, each of the convex parts PR of the retardation RT had a gently inclined part C1 and a steeply inclined part C2. The retardation RT had a shape in which a substantial backward N shape was repeated.

Figure 15:
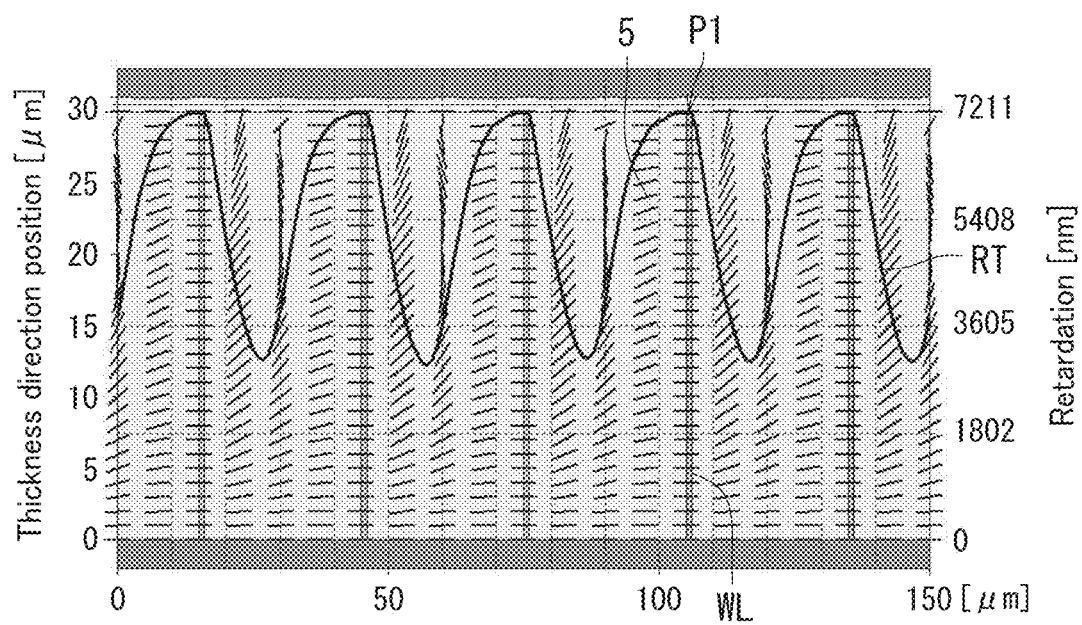
FIG. 15 is a diagram illustrating a retardation of a liquid crystal element including wall members (highly resistive material) according to Example 2 of the present invention.

FIG. 15 illustrates the retardation RT of the liquid crystal element 100 according to Example 2. In Example 2, the material of the wall members WL was a highly resistive material. In the liquid crystal element 100 according to Example 2 as illustrated in FIG. 15, the amplitude difference in the retardation RT was approximately 4300 (nm). Accordingly, in Example 2, the amplitude difference in the retardation RT could be inhibited from attenuating relative to Comparative Example 1.

Figure 16:
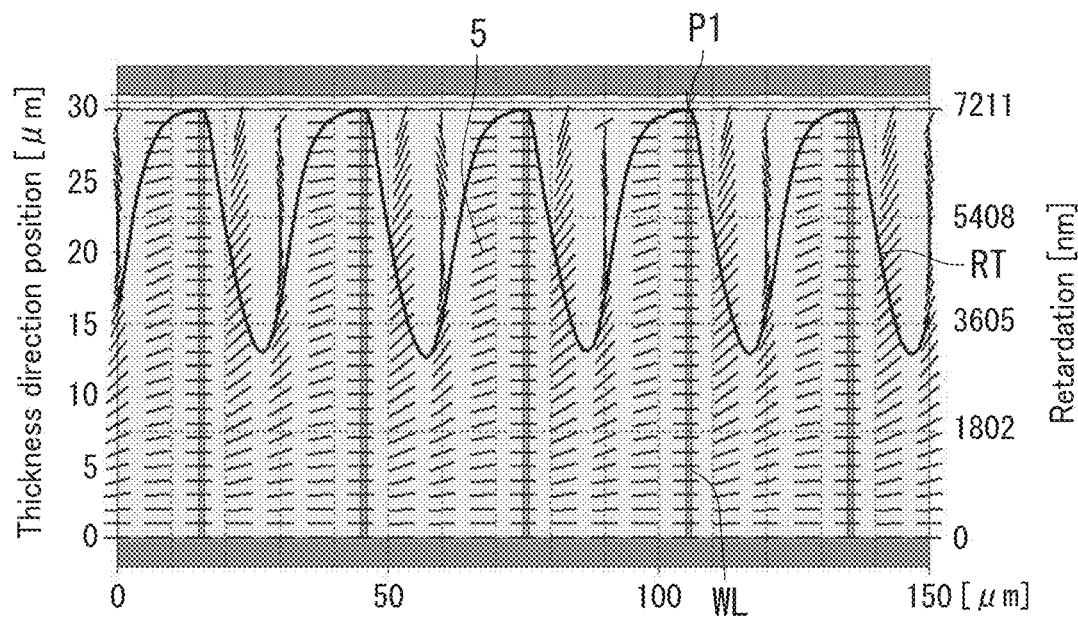
FIG. 16 is a diagram illustrating a retardation of a liquid crystal element including wall members (electrical insulator) according to Example 3 of the present invention.

FIG. 16 illustrates the retardation RT of the liquid crystal element 100 according to Example 3. In Example 3, the material of the wall members WL was an electrical conductor. In the liquid crystal element 100 according to Example 3 as illustrated in FIG. 16, the amplitude difference in the retardation RT was approximately 4300 (nm). Accordingly, in Example 3, the amplitude difference in the retardation RT could be inhibited from attenuating relative to comparative example 1.

As can be understood from Examples 1 to 3 illustrated in FIGS. 14 to 16, the wall members WL inhibited the amplitude difference in the retardation RT from attenuating independent of the electrical resistivity of the wall members WL. Note that the shape of the retardation RT in each of Examples 2 and 3 had the same characteristics as the shape of the retardation RT in Example 1.

Examples 4 to 7

The liquid crystal elements 100 according to Examples 4 to 7 of the present invention and the liquid crystal element according to Comparative Example 1 are described with reference to FIGS. 17 to 22.

Figure 17:
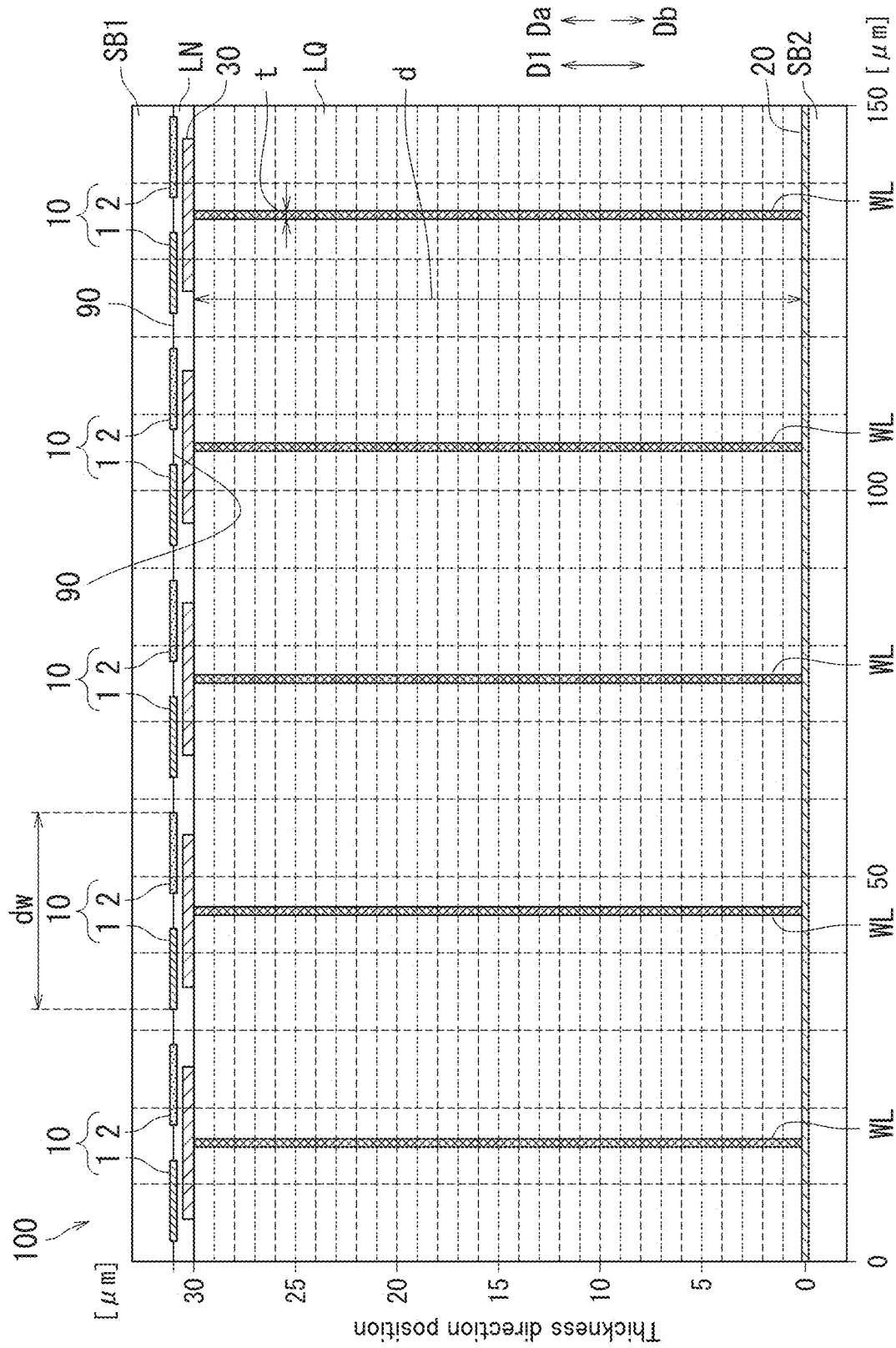
FIG. 17 is a cross-sectional view of a liquid crystal element according to other examples of the present invention.

FIG. 17 is a cross-sectional view of a liquid crystal element 100 according to the examples of the present invention. As illustrated in FIG. 17, the configuration of the liquid crystal element 100 according to the present examples is the same as the configuration of the liquid crystal element 100G according to the second embodiment described with reference to FIG. 9.

Furthermore, the liquid crystal element 100 illustrated in FIG. 17 includes a plurality of highly resistive layers 30 in addition to the configuration of the liquid crystal element 100 illustrated in FIG. 12. The conditions of the liquid crystal element 100 illustrated in FIG. 17 are the same as the conditions of the liquid crystal element 100 illustrated in FIG. 12 except for the highly resistive layers 30. The anchoring energy of the wall members WL, was $1 \times 10^{30}$ (J/m$^2$).

In each of Examples 4 to 7, the retardation RT was calculated by a simulation under the condition using the liquid crystal element 100 in FIG. 17. The liquid crystal element according to Comparative Example 2 had a configuration in which the wall members WL were removed from the liquid crystal element 100 in FIG. 17.

In Comparative Example 2 and Examples 4 to 6, the first voltage V1 applied to the first electrodes 1 was 0.5 V (effective value). The second voltage V2 applied to the second electrodes 2 was 3.0 V (effective value).

By contrast, in Example 7, the first voltage V1 applied to the first electrodes 1 was 3.0 V (effective value). The second voltage V2 applied to the second electrodes 2 was 0.5 V (effective value).

Figure 18:
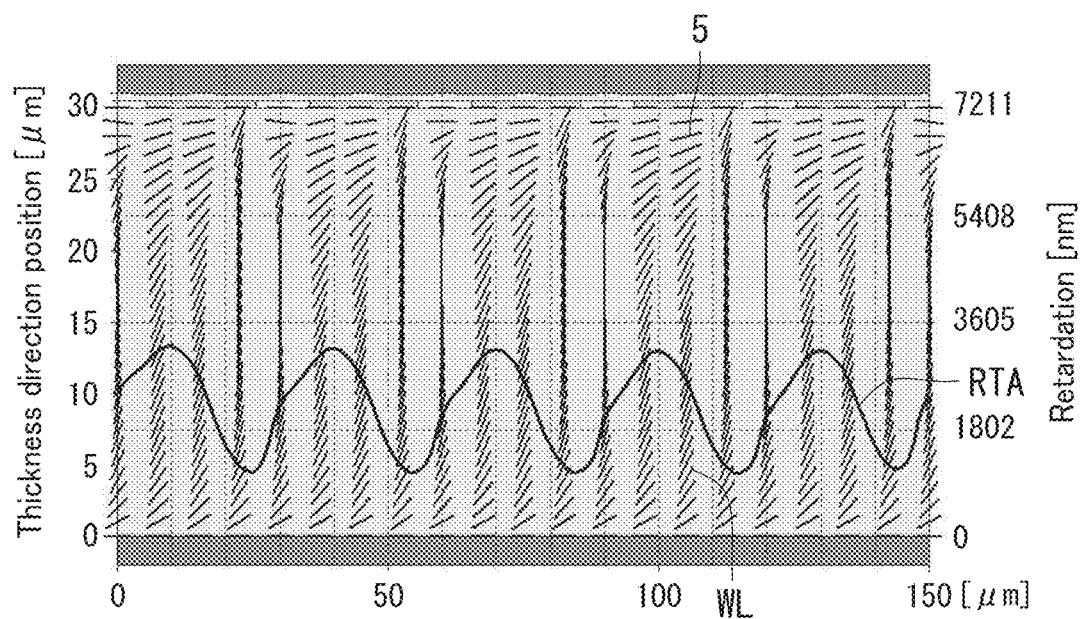
FIG. 18 is a diagram illustrating a retardation of a liquid crystal element according to Comparative Example 2.

FIG. 18 illustrates a retardation RTA of the liquid crystal element according to Comparative Example 2. In the liquid crystal element according to Comparative Example 2 as illustrated in FIG. 18, the amplitude difference in the retardation RTA was approximately 1800 (nm).

Figure 19:
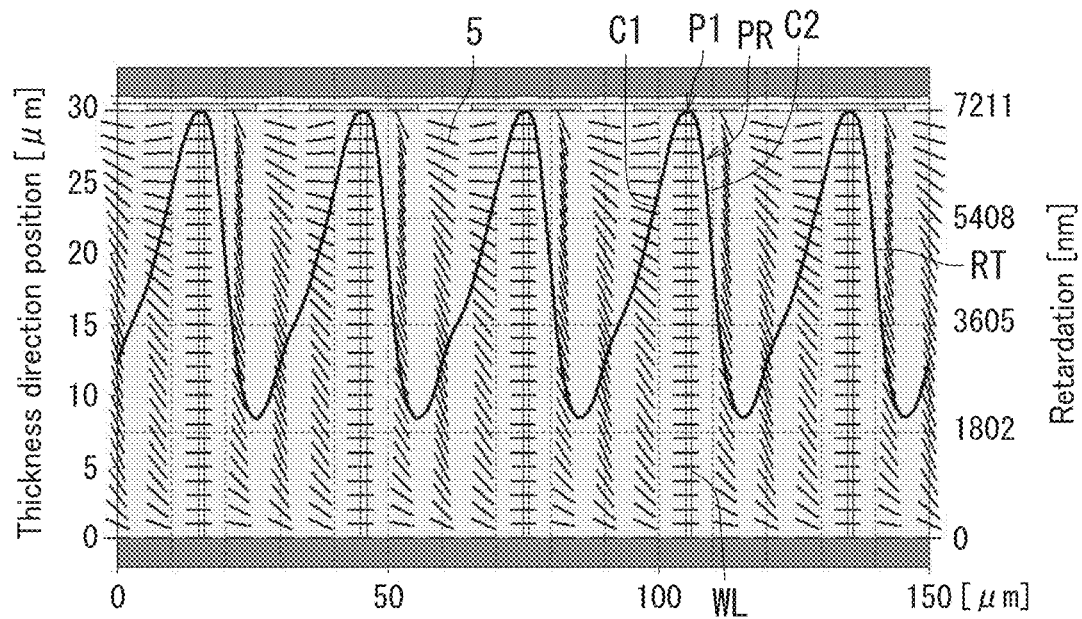
FIG. 19 is a diagram illustrating a retardation of a liquid crystal element (V1<V2) including wall members (electrical insulator) according to Example 4 of the present invention.

FIG. 19 illustrates the retardation RT of the liquid crystal element 100 according to Example 4. In Example 4, the material of the wall members WL was an electrical insulator. In the liquid crystal element 100 according to Example 4 as illustrated in FIG. 19, the amplitude difference in the retardation RT was approximately 5000 (nm). Accordingly, in a case in which the liquid crystal element 100 had the highly resistive layers 30 as in example 4, the amplitude difference in the retardation RT could be inhibited from attenuating as compared to Comparative Example 2. Furthermore, each of the convex parts PR of the retardation RT had a gently inclined part C1 and a steeply inclined part C2. The retardation RT had a shape in which a substantial backwards N shape was repeated.

Figure 20:
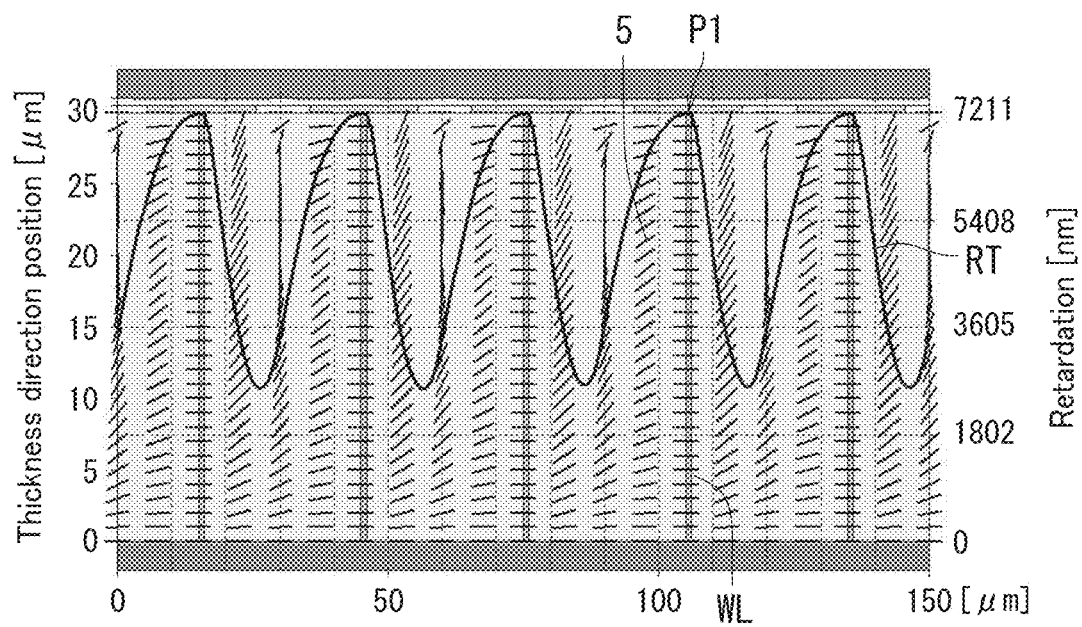
FIG. 20 is a diagram illustrating a retardation of a liquid crystal element (V1<V2) including wall members (highly resistive material) according to Example 5 of the present invention.

FIG. 20 illustrates the retardation RT of the liquid crystal element 100 according to Example 5. In Example 5, the material of the wall members WL was a highly resistive material. In the liquid crystal element 100 according to Example 5 as illustrated in FIG. 20, the amplitude difference in the retardation RT was approximately 4500 (nm). Accordingly, in a case in which the liquid crystal element 100 had the highly resistive layers 30 as in Example 5, the amplitude difference in the retardation RT could be inhibited from attenuating as compared to Comparative Example 2.

Figure 21:
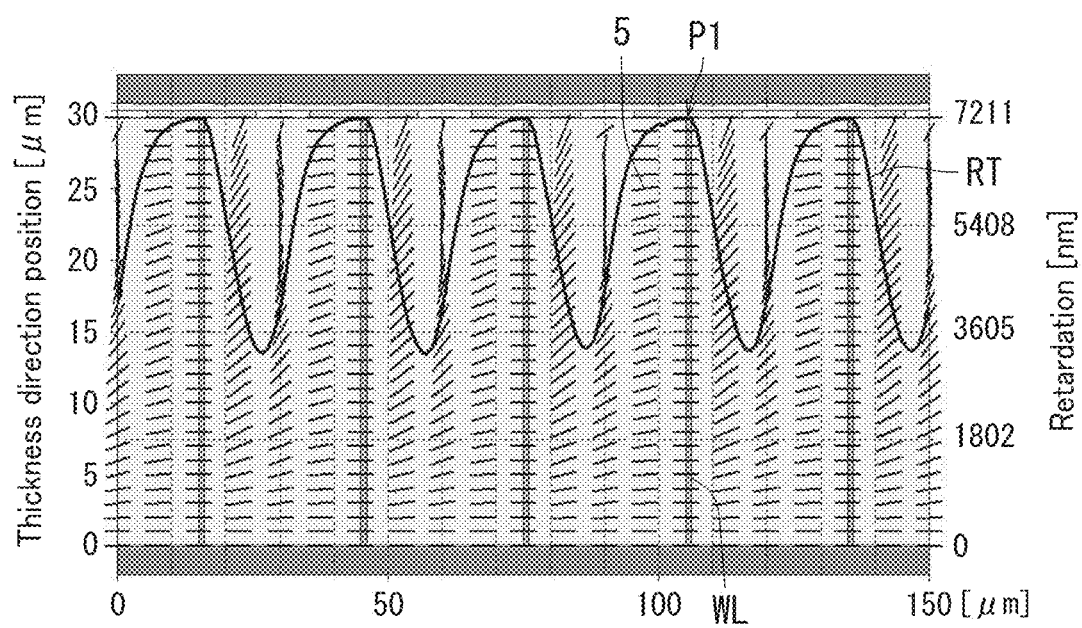
FIG. 21 is a diagram illustrating a retardation of a liquid crystal element including wall members (electrical conductor) according to Example 6 of the present invention.

FIG. 21 illustrates the retardation RT of the liquid crystal element 100 according to Example 6. In Example 6, the material of the wall members WL was an electrical conductor. In the liquid crystal element 100 according to Example 6 as illustrated in FIG. 21, the amplitude difference in the retardation RT was approximately 4000 (nm). Accordingly, in a case in which the liquid crystal element 100 had the highly resistive layers 30 as in Example 6, the amplitude difference in the retardation RT could be inhibited from attenuating as compared to Comparative Example 2.

As can be understood from Examples 4 to 6 illustrated in FIGS. 19 to 21, the wall members WL inhibited the amplitude difference in the waveform retardation RT from attenuating independent of the electrical resistivity of the wall members WL in a case in which the liquid crystal element 100 had the highly resistive layers 30. Note that the shape of the retardation RT in Examples 5 and 6 had the same characteristics as the shape of the retardation RT in Example 4.

Figure 22:
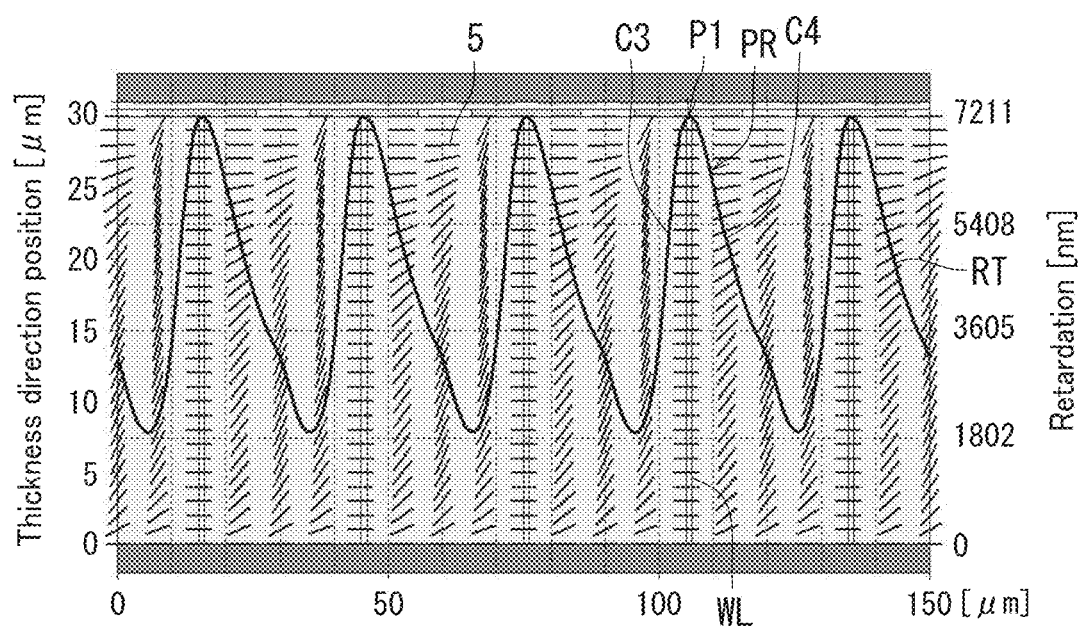
FIG. 22 is a diagram illustrating a retardation of a liquid crystal element (V1>V2) including wall members (electrical insulator) according to Example 7 of the present invention.

FIG. 22 illustrates the retardation RT of the liquid crystal element 100 according to Example 7. Example 7 differs from Example 4 in which the first voltage V1 was lower than the second voltage V2 in that the first voltage V1 was higher than the second voltage. In Example 7, the material of the wall members WL was an electrical insulator in the same manner as in example 4.

In the liquid crystal element 100 according to Example 7 as illustrated in FIG. 22, the amplitude difference in the retardation RT was approximately 5000 (nm). Accordingly, in a case in which the liquid crystal element 100 had the highly resistive layers 30 as in Example 7, the amplitude difference in the retardation RT could be inhibited from attenuating as compared to comparative Example 2.

Furthermore, upon comparing Example 4 illustrated in FIG. 19 to Example 7 illustrated in FIG. 22, it was confirmed that the amplitude difference in the retardation RT can inhibited from attenuating as compared to Comparative Example 2 independent of the relative sizes of the first voltage V1 and the second voltage V2. Additionally, each of the convex parts PR of the retardation RT had a steeply inclined part C3 and a gently inclined part C4. The retardation RT had a shape in which a substantial N shape was repeated.

Examples 8 to 11

The liquid crystal elements 100 according to Examples 8 to 11 of the present invention are described with reference to FIGS. 23 to 26. In each of Examples 8 to 11, the retardation RT was calculated by a simulation under the condition using the liquid crystal element 100 in FIG. 17. The first voltage V1 was 0.5 V (effective value) and the second voltage V2 was 3.0 V (effective value).

However, in Examples 8 to 11, the anchoring energy of the wall members WL was set as smaller than the anchoring energy of the wall members WL in Examples 4 to 6.

Figure 23:
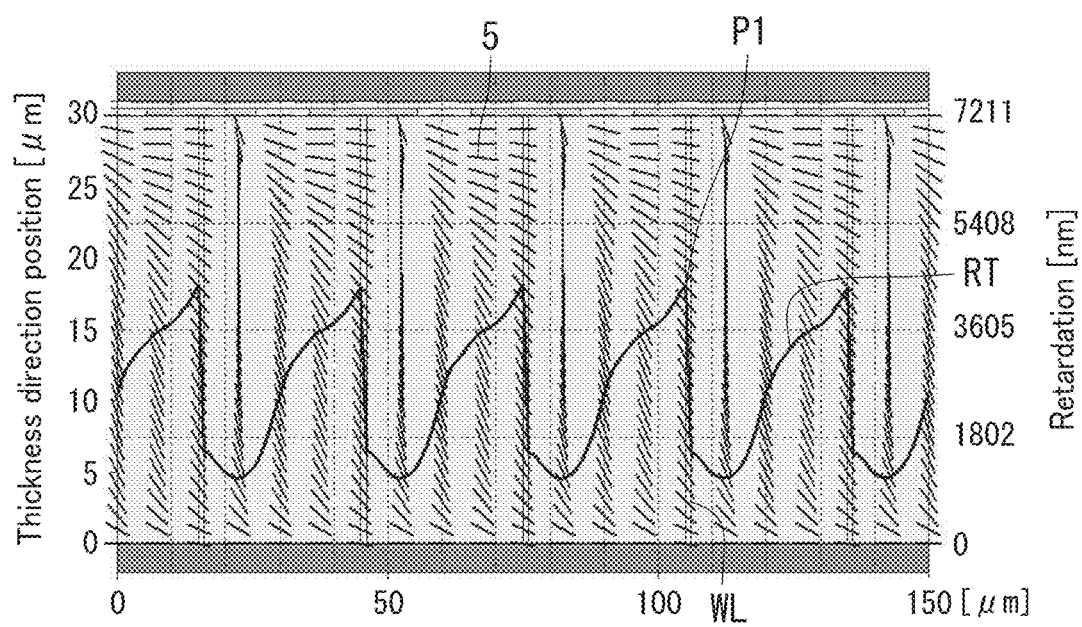
FIG. 23 is a diagram illustrating a retardation of a liquid crystal element (anchoring energy: $1\times10^{-6}$) including wall members (electrical insulator) according to Example 8 of the present invention.

FIG. 23 illustrates the retardation RT of the liquid crystal element 100 according to Example 8. In Example 8, the wall members WL were constituted by an electrical insulator, and the anchoring energy of the wall members WL was $1 \times 10^{-6}$ ($J/m^2$).

In the liquid crystal element 100 according to Example 8 as illustrated in FIG. 23, the amplitude difference in the retardation RT was approximately 3500 (nm). Accordingly, even in a case in which the anchoring energy was $1 \times 10^{-6}$ ($J/m^2$) when the wall members WL each were an electrical insulator as in Example 8, the amplitude difference in the retardation RT was inhibited from attenuating as compared to Comparative Example 2 (FIG. 18).

Figure 24:
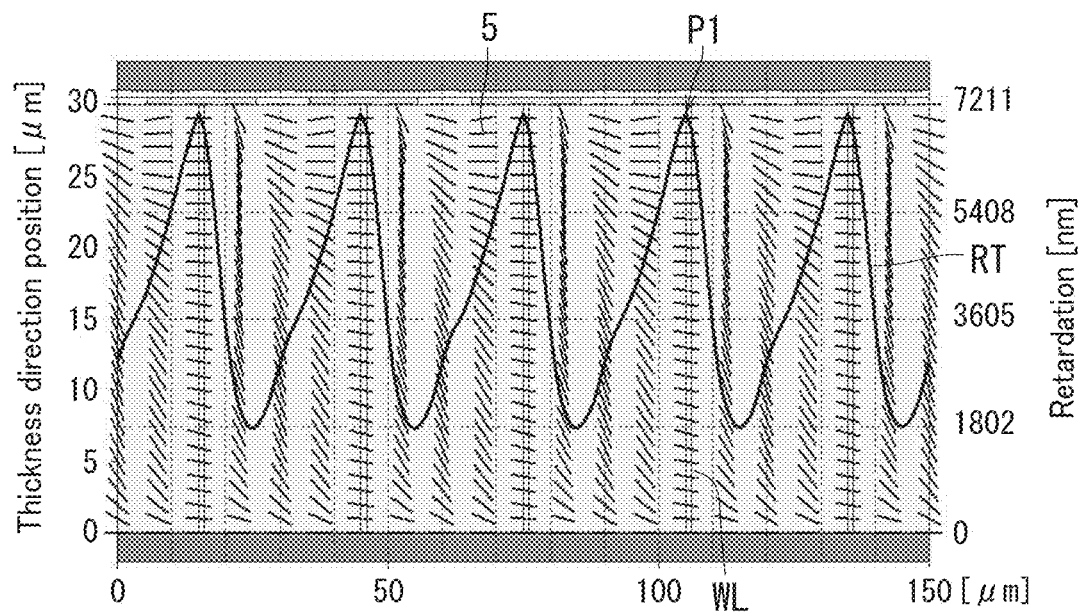
FIG. 24 is a diagram illustrating a retardation of a liquid crystal element (anchoring energy: $1\times10^{-5}$) including wall members (electrical insulator) according to Example 9 of the present invention.

FIG. 24 illustrates the retardation RT of the liquid crystal element 100 according to Example 9. In Example 9, the wall members WL were constituted by an electrical insulator, and the anchoring energy of the wall members WL was $1 \times 10^{-5}$ ($J/m^2$).

In the liquid crystal element 100 according to Example 9 as illustrated in FIG. 24, the amplitude difference in the retardation RT was approximately 5400 (nm). Accordingly, even in a case in which the anchoring energy of the wall members WL was $1 \times 10^{-5}$ ($J/m^2$), when the wall members WL each were an electrical insulator as in Example 9, the amplitude difference in the retardation RT was inhibited from attenuating as compared to Comparative Example 2 (FIG. 18).

Furthermore, even in a case in which the anchoring energy of the wall members WL was $1 \times 10^{-5}$ ($J/m^2$) as in Example 9, the amplitude difference in the retardation RT was ensured to the same degree as in Example 4 (FIG. 19) in which the anchoring energy was $1 \times 10^{30}$ ($J/m^2$). As a result, by setting the anchoring energy of the wall members WL to at least $1 \times 10^{-5}$ ($J/m^2$), it was confirmed that an adequate amplitude difference in the retardation RT can be ensured.

Figure 25:
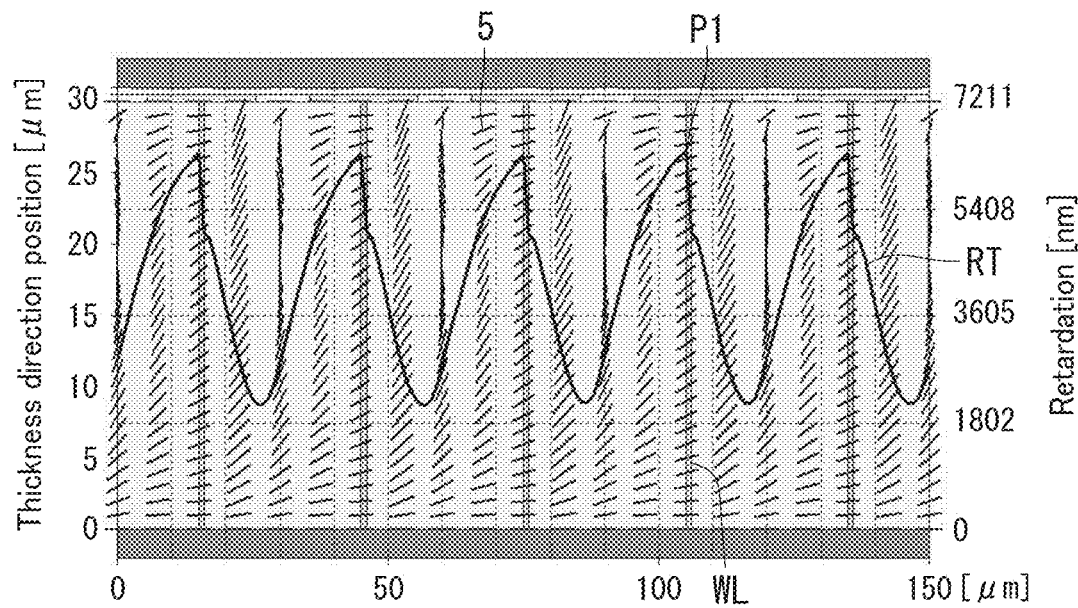
FIG. 25 is a diagram illustrating a retardation of a liquid crystal element (anchoring energy: $1\times10^{-6}$) including wall members (highly resistive material) according to Example 10 of the present invention.

FIG. 25 illustrates the retardation RT of the liquid crystal element 100 according to Example 10. In Example 10, the wall members WL each were constituted by a highly resistive material, and the anchoring energy of the wall members WL was $1 \times 10^{-6}$ ($J/m^2$).

In the liquid crystal element 100 according to Example 10 as illustrated in FIG. 25, the amplitude difference in the retardation RT was approximately 3600 (nm). Accordingly, even in a case in which the anchoring energy of the wall members WL was $1 \times 10^{-6}$ ($J/m^2$), when the wall members WL each were a highly resistive material as in example 10, the amplitude difference in the retardation RT was inhibited from attenuating as compared to Comparative Example 2 (FIG. 18).

Figure 26:
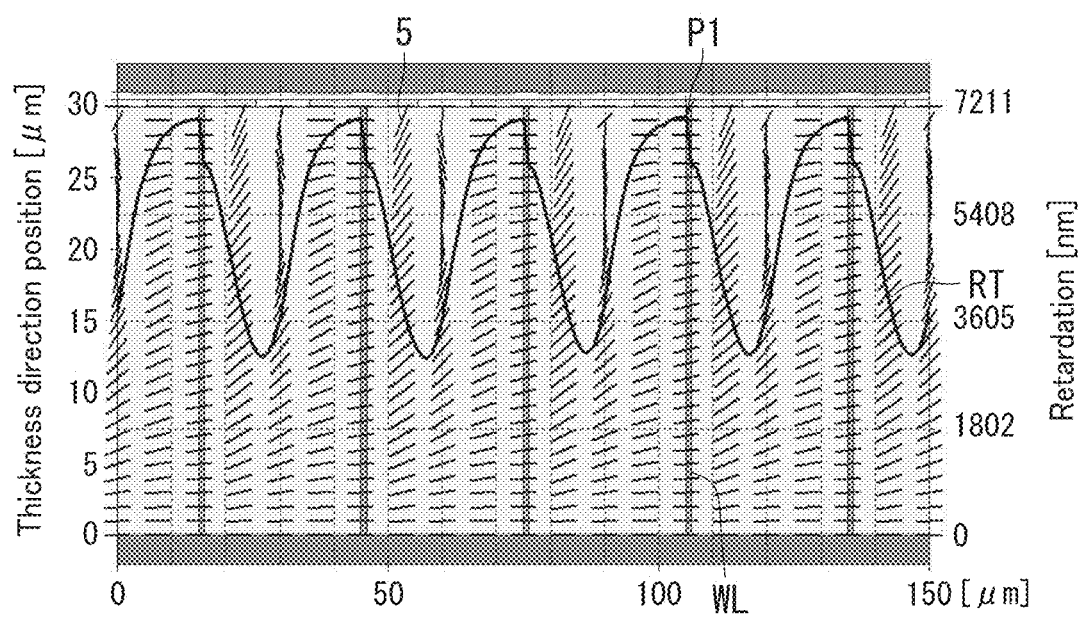
FIG. 26 is a diagram illustrating a retardation of a liquid crystal element (anchoring energy: $1\times10^{-6}$ including wall members (electrical conductor) according to Example 11 of the present invention.

FIG. 26 illustrates the retardation RT of the liquid crystal element 100 according to Example 11. In Example 11, the wall members WL each were constituted by an electrical conductor, and the anchoring energy of the wall members WL was $1 \times 10^{-6}$ ($J/m^2$).

In the liquid crystal element 100 according to Example 11 as illustrated in FIG. 26, the amplitude difference in the retardation RT was approximately 3600 (nm). Accordingly, even in a case in which the anchoring energy of the wall members WL was $1\times10^{-6}$ (J/m$^2$), when the wall members WL, each were an electrical conductor as in Example 11, the amplitude difference in the retardation RT was inhibited from attenuating as compared to Comparative Example 2 (FIG. 18).

Note that even in a case in which the wall members WL each were constituted by a highly resistive material or an electrical conductor, it was easily measured that an adequate amplitude difference in the retardation RT can be ensured by setting the anchoring energy of the wall members WL to at least $1\times10^{-5}$ (J/m$^2$) in the same manner as in example 9. This is because as was made clear from Examples 4 to 6 of FIGS. 19 to 21, the wall members WL inhibited the amplitude difference in the waveform retardation RT from attenuating independent of the electrical resistivity of the wall members WL.

Examples 12 to 14

The liquid crystal elements 100 according to Examples 12 to 14 of the present invention are described with reference to FIGS. 27A to 29. Example 12 includes Examples 12A and 12B. In Examples 12 to 14, the retardation RT was calculated by a simulation under the condition using the liquid crystal element 100 in FIG. 17.

However, in Examples 12 to 14, the positions of the wall members WL differed from the positions of the wall members WL in Examples 4 to 6. In each of Examples 12A, 13, and 14, the first voltage V1 was 0.5 V (effective value), and the second voltage V2 was 3.0 V (effective value). In Example 12B, the first voltage V1 was 3.0 V (effective value), and the second voltage V2 was 0.5 V (effective value).

In Examples 12A and 12B, the wall members WL are each constituted by an electrical insulator, and the wall members WL were opposite to the areas 92 (FIG. 17) between adjacent unit electrodes 10. That is, the configuration of the liquid crystal element 100 according to Example 12 was a configuration in which the highly resistive layers 30 illustrated in FIG. 9 were added to the configuration of the liquid crystal element 100B illustrated in FIG. 4A.

Figure 27A:
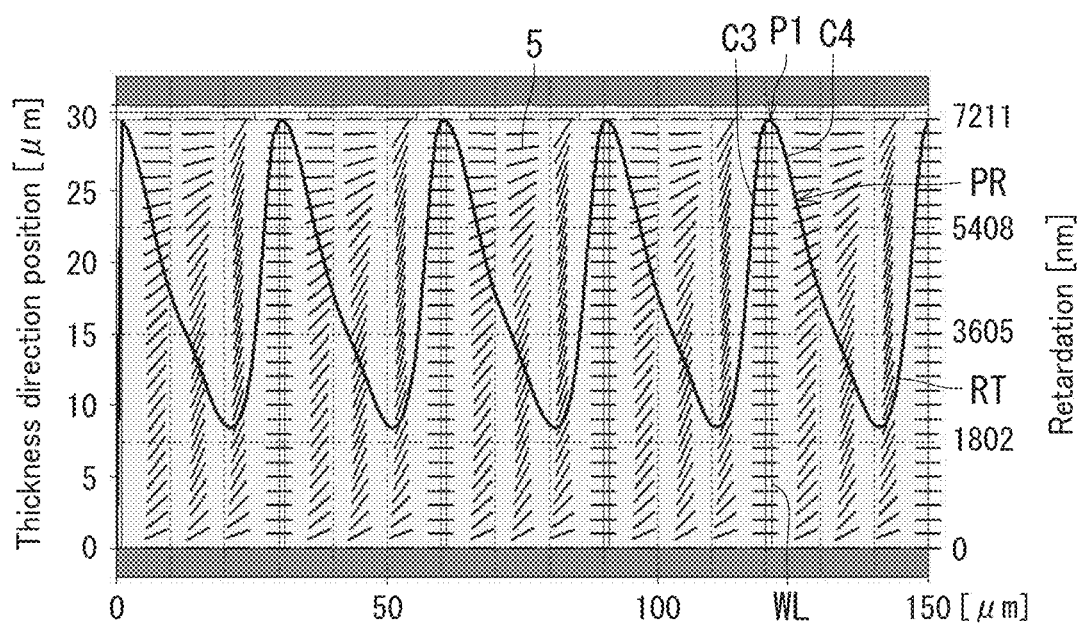
FIG. 27A is a diagram illustrating a retardation of a liquid crystal element including wall members (directly beneath areas between unit electrodes, V1<V2) according to Example 12A of the present invention.
Figure 27B:
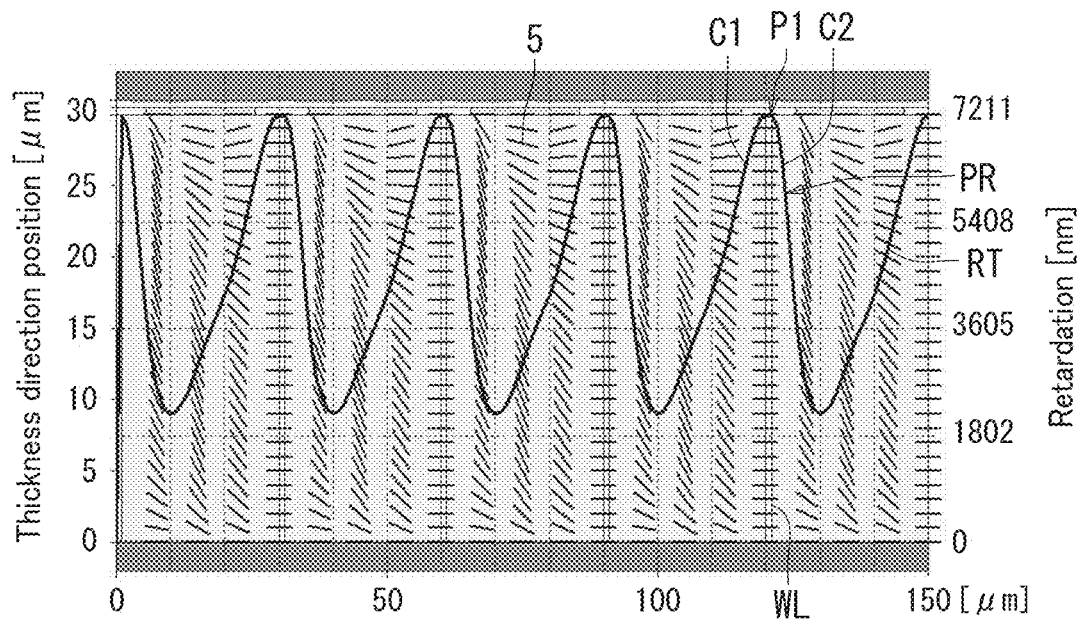
FIG. 27B is a diagram illustrating a retardation of a liquid crystal element including wall members (directly beneath areas between unit electrodes, V1>V2) according to Example 12B of the present invention.

FIG. 27A illustrates the retardation RT (V1<V2) of the liquid crystal element 100 according to Example 12A. FIG. 27B illustrates the retardation RT (V1>V2) of the liquid crystal element 100 according to Example 12B.

In each of the liquid crystal elements 100 according to Examples 12A and 12B as illustrated in FIGS. 27A and 27B, the amplitude difference in the retardation RT was approximately 5400 (nm). Accordingly, even in a case in which the wall members WL were opposite to the areas 92 as in Examples 12A and 12B, the amplitude difference in the retardation RT was inhibited from attenuating as compared to Comparative Example 2 (FIG. 18).

Furthermore, as illustrated in FIG. 27A, each of the convex parts PR of the retardation RT in Example 12A had a steeply inclined part C3 and a gently inclined part C4. The retardation RT in Example 12A had a shape in which a substantial N shape was repeated. By contrast, as illustrated in FIG. 27B, each of the convex parts PR of the retardation RT in Example 12B had a gently inclined part C1 and a steeply inclined part C2, The retardation RT in example 12B had a shape in which a substantial backwards N shape was repeated.

Figure 28:
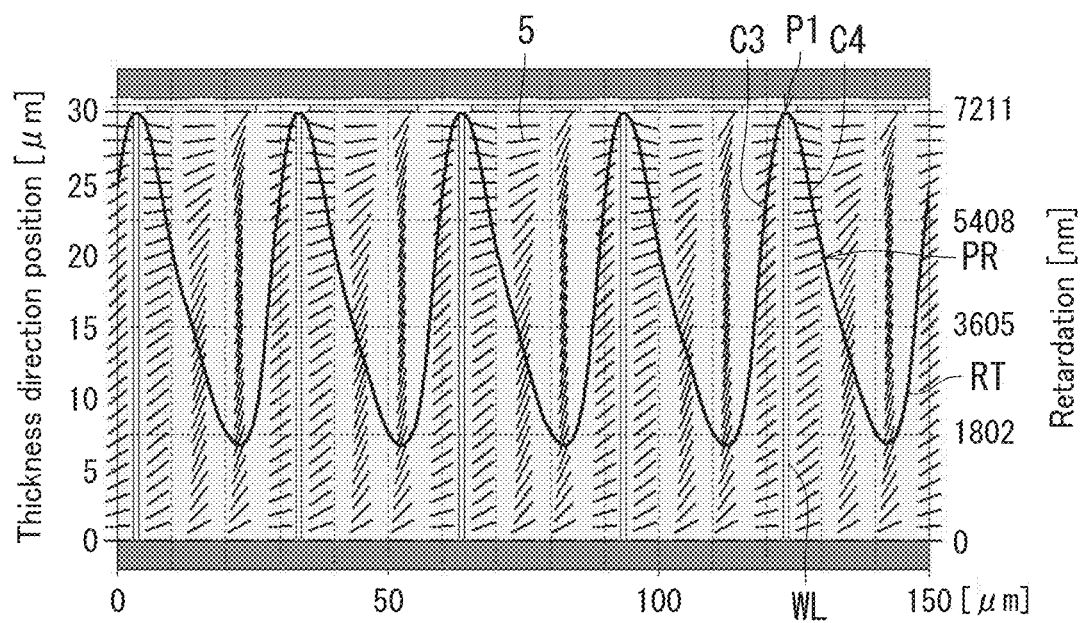
FIG. 28 is a diagram illustrating the retardation of a liquid crystal element including wall members (directly beneath first electrodes) according to Example 13 of the present invention.

FIG. 28 illustrates the retardation RT of the liquid crystal element 100 according to Example 13. In Example 13, the wall members WL each were constituted by an electrical insulator, and the wall members WL were opposite to the first electrodes 1 (FIG. 17). That is, the configuration of the liquid crystal element 100 according to Example 13 was a configuration in which the highly resistive layers 30 illustrated in FIG. 9 were added to the configuration of the liquid crystal element 100C illustrated in FIG. 5.

In the liquid crystal element 100 according to Example 13 as illustrated in FIG. 28, the amplitude difference in the retardation RT was approximately 5400 (nm). Accordingly, even in a case in which the wall members WL were opposite to the first electrodes 1 as in example 13, the amplitude difference in the retardation RT was inhibited from attenuating as compared to Comparative Example 2 (FIG. 18). Each of the convex parts PR of the retardation RT had a steeply inclined part C3 and a gently inclined part C4. The retardation RT had a shape in which a substantial N shape was repeated.

Figure 29:
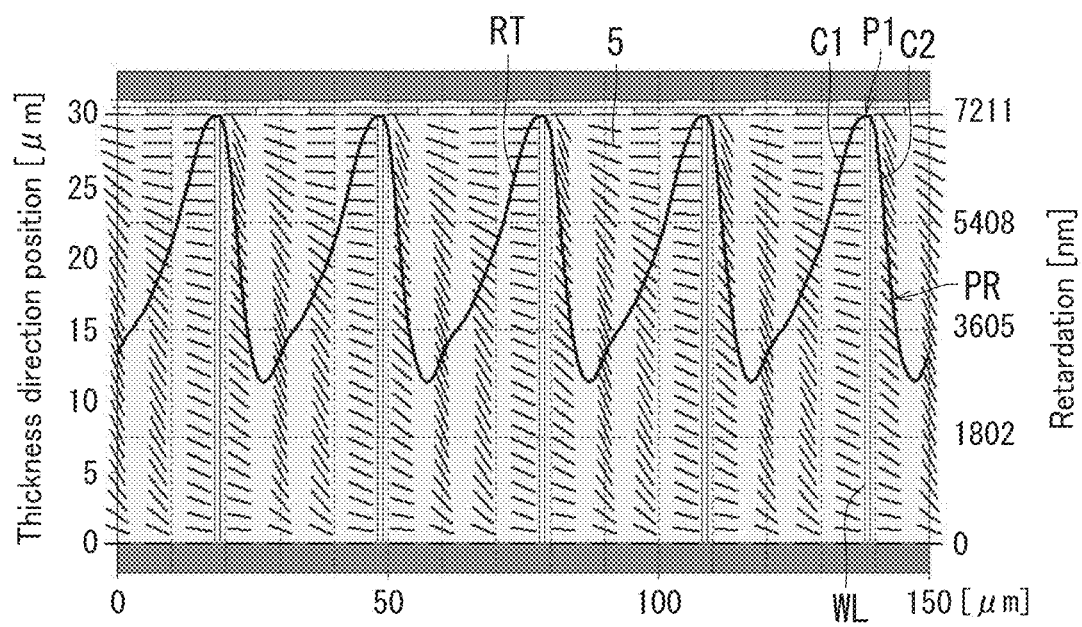
FIG. 29 is a diagram illustrating the retardation of a liquid crystal element including wall members (directly beneath second electrodes) according to Example 14 of the present invention.

FIG. 29 illustrates the retardation RT of the liquid crystal element 100 according to Example 14. In Example 14, the wall members WL each were constituted by an electrical insulator and the wall members WL were opposite to the second electrodes 2 (FIG. 17). That is, the configuration of the liquid crystal element 100 according to Example 14 was a configuration in which the highly resistive layers 30 illustrated in FIG. 9 were added to the configuration of the liquid crystal element 100D illustrated in FIG. 6.

In the liquid crystal element 100 according to Example 14 as illustrated in FIG. 29, the amplitude difference in the retardation RT was approximately 4500 (nm). Accordingly, even in a case in which the wall members WL were opposite to the second electrodes 2 as in Example 14, the amplitude difference in the retardation RT was inhibited from attenuating as compared to Comparative Example 2 (FIG. 18). Each of the convex parts PR of the retardation RT had a gently inclined part C1 and a steeply inclined part C2. The retardation RT had a shape in which a substantial backwards N shape was repeated.

As can be understood from Examples 12 to 14 of FIGS. 27A to 29, it was confirmed that the amplitude difference in the retardation RT can be inhibited from attenuating as compared to Comparative Example 2 independent of the positions of the wall members WL. Furthermore, the amplitude difference in the retardation RT in Example 13 (the wall members WL being directly beneath the first electrodes 1) illustrated in FIG. 28 was greater than the amplitude difference in the retardation RT in Example 14 (the wall members WL being directly beneath the second electrodes 2) illustrated in FIG. 29.

Note that even in a case in which the wall members WL each were constituted by a highly resistive material or an electrical conductor, it was easily measured that the amplitude difference in the retardation RT can be inhibited from attenuating as compared to Comparative Example 2 independent of the positions of the wall members WL in the same manner as in Examples 12 to 14. This is because as was made clear from Examples 4 to 6 in FIGS. 19 to 21, the wall members WL inhibited the amplitude difference in the waveform retardation RT from attenuating independent of the electrical resistivity of the wall members WL.

Examples 15 to 17

The liquid crystal elements 100 according to Examples 15 to 17 of the present invention are described with reference to FIGS. 30 to 32. In Examples 15 to 17, the retardation RT was calculated by a simulation under the condition using the liquid crystal element 100 of FIG. 17. The first voltage V1 was 0.5 V (effective value), the second voltage V2 was 3.0 V (effective value).

However, in Examples 15 to 17, the pre-twist angle differed from that in Examples 4 to 6.

Figure 30:
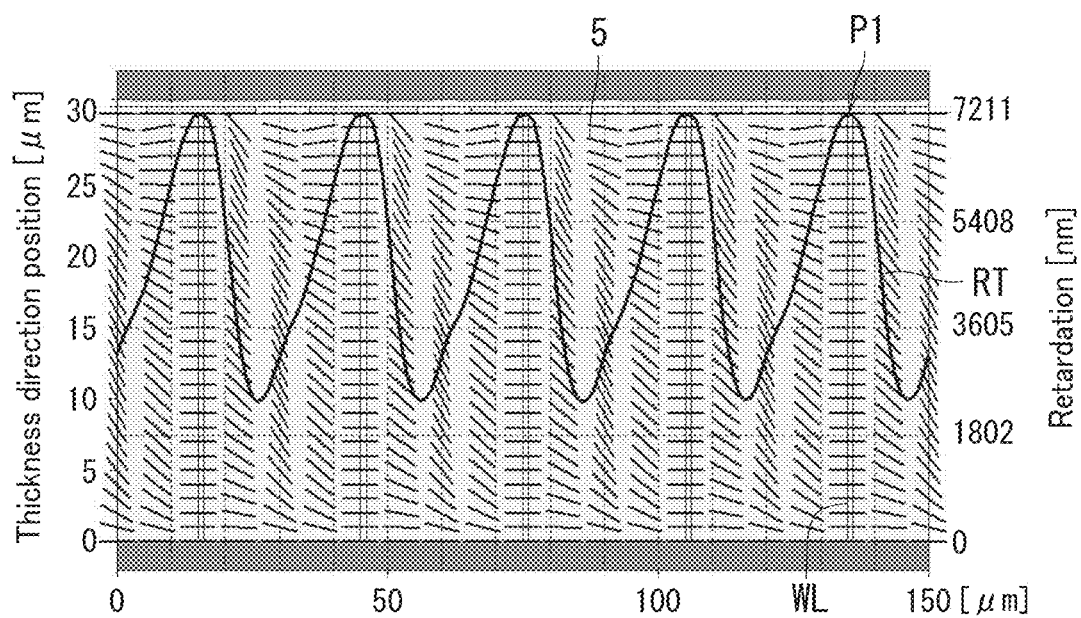
FIG. 30 is a diagram illustrating the retardation of a liquid crystal element (pre-twist angle: 0 degrees) including wall members according to Example 15 of the present invention.

FIG. 30 illustrates the retardation RT of the liquid crystal element 100 according to Example 15. In Example 15, the wall members WL each were constituted by an electrical insulator, and the pre-twist angle by the alignment films AF1 and AF2 was 0 degrees refer to FIG. 3B).

In the liquid crystal element 100 according to Example 15 as illustrated in FIG. 30, the amplitude difference in the retardation RT was approximately 4500 (nm). Accordingly, even in a case in which the pre-twist angle was 0 degrees as in Example 15, the amplitude difference in the retardation RT was inhibited from attenuating relative to comparative example 2 (FIG. 18).

Figure 31:
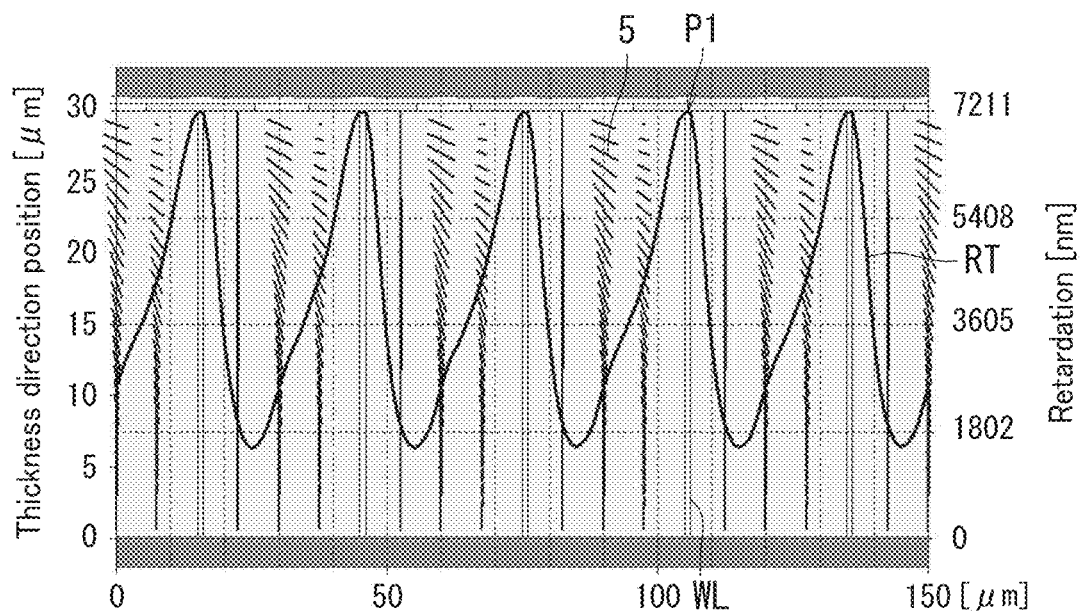
FIG. 31 is a diagram illustrating a retardation of a liquid crystal element (pre-twist angle: 90 degrees) including wall members according to Example 16 of the present invention.

FIG. 31 illustrates the retardation RT of the liquid crystal element 100 according to Example 16. In Example 16, the wall members WL were each constituted by an electrical insulator, and the pre-twist angle by the alignment films AF1 and AF2 was 90 degrees (refer to FIG. 3C).

In the liquid crystal element 100 according to Example 16 as illustrated in FIG. 31, the amplitude difference in the retardation RT was approximately 5500 (nm). Accordingly, even in a case in which the pre-twist angle was 90 degrees as in Example 16, the amplitude difference in the retardation RT was inhibited from attenuating as compared to Comparative Example 2 (FIG. 18).

Figure 32:
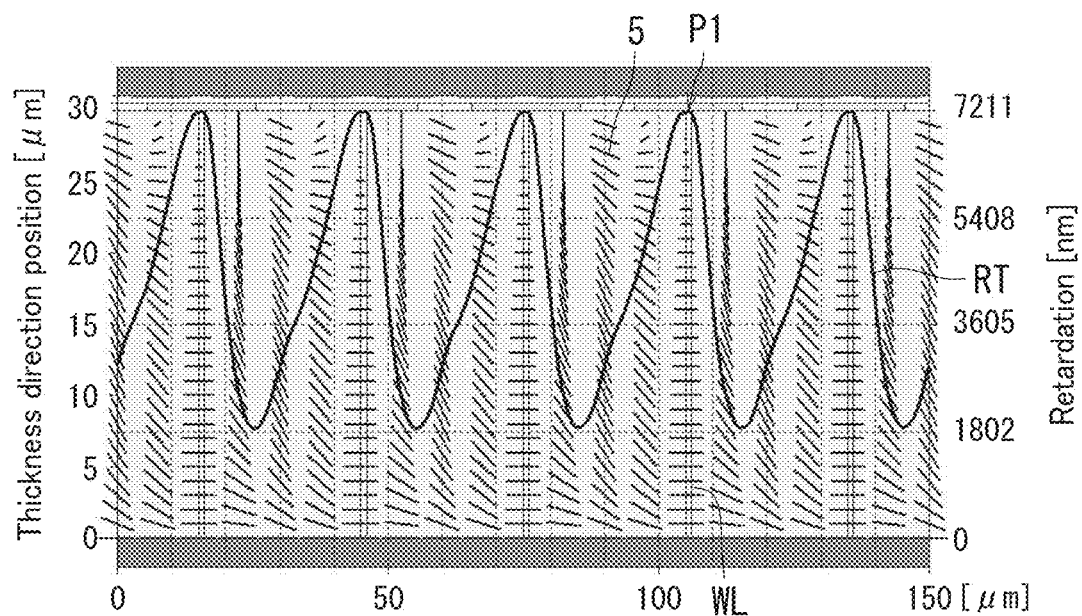
FIG. 32 is a diagram illustrating a retardation of a liquid crystal element (pre-twist angle: 0 degrees to 90 degrees) including wall members according to Example 17 of the present invention.

FIG. 32 illustrates the retardation RT of the liquid crystal element 100 according to Example 17. In Example 17, the wall members WL were each constituted by an electrical insulator, the pre-twist angle by the alignment film. AF2 was 0 degrees, and the pre-twist angle by the alignment film AF1 was 90 degrees (refer to FIG. 3D).

In the liquid crystal element 100 according to Example 17 as illustrated in FIG. 32, the amplitude difference in the retardation RT was approximately 5400 (nm). Accordingly, even in a case in which the liquid crystal molecules 5 were twisted between the interfaces BF1 and BF2 of the liquid crystal layer LQ as in Example 17, the amplitude difference in the retardation RT was inhibited from attenuating as compared to Comparative Example 2 (FIG. 18).

As can be understood from Examples 15 to 17 in FIGS. 30 to 32, it was confirmed that the amplitude difference in the retardation RT can be inhibited from attenuating compared to Comparative Example 2 independent of the pre-twist angle.

Note that even in a case in which the wall members WL were each constituted by a highly resistive material or an electrical conductor, it was easily measured that the amplitude difference in the retardation RT can be inhibited from attenuating as compared to Comparative Example 2 independent of the pre-twist angle in the same manner as in Examples 15 to 17. This is because as was made clear from Examples 4 to 6 in FIGS. 19 to 21, the wall members WL inhibited the amplitude difference in the waveform retardation RT from attenuating independent of the electrical resistivity of the wall members WL.

Examples 18 and 19

The liquid crystal elements 100 according to Examples 18 and 19 of the present invention and Comparative Example 3 are described with reference to FIGS. 33 to 35. In Examples 18 and 19, the retardation RT was calculated by a simulation under the condition using the liquid crystal element 100 in FIG. 17. The first voltage V1 was 0.5 V (effective value), the second voltage V2 was 3.0 V (effective value).

However, in Examples 18 and 19 and Comparative Example 3, the thickness d of the liquid crystal layer LQ was 15 µm. Furthermore, in Examples 18 and 19, the length of the wall members WL differed from that in Examples 4 to 6. The liquid crystal element according to Comparative Example 3 had no wall members WL.

Figure 33:
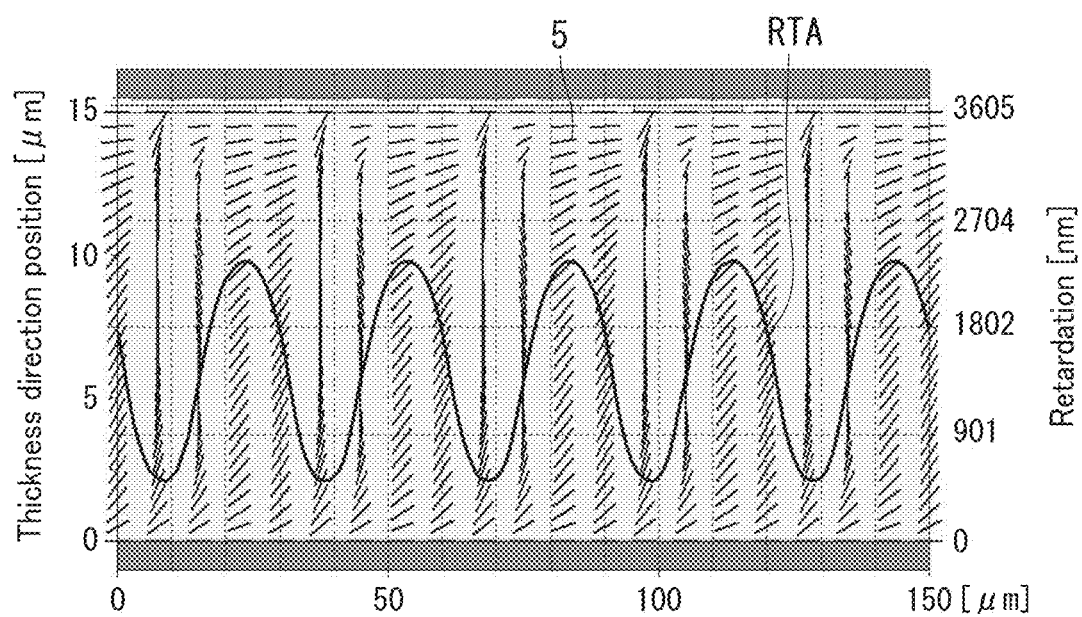
FIG. 33 is a diagram illustrating a retardation of a liquid crystal element according to Comparative Example 3.

FIG. 33 illustrates a retardation RT of the liquid crystal element according to Comparative Example 3. In the liquid crystal element according to Comparative Example 3 as illustrated in FIG. 33, the amplitude difference in the retardation RTA was approximately 1800 (nm).

Figure 34:
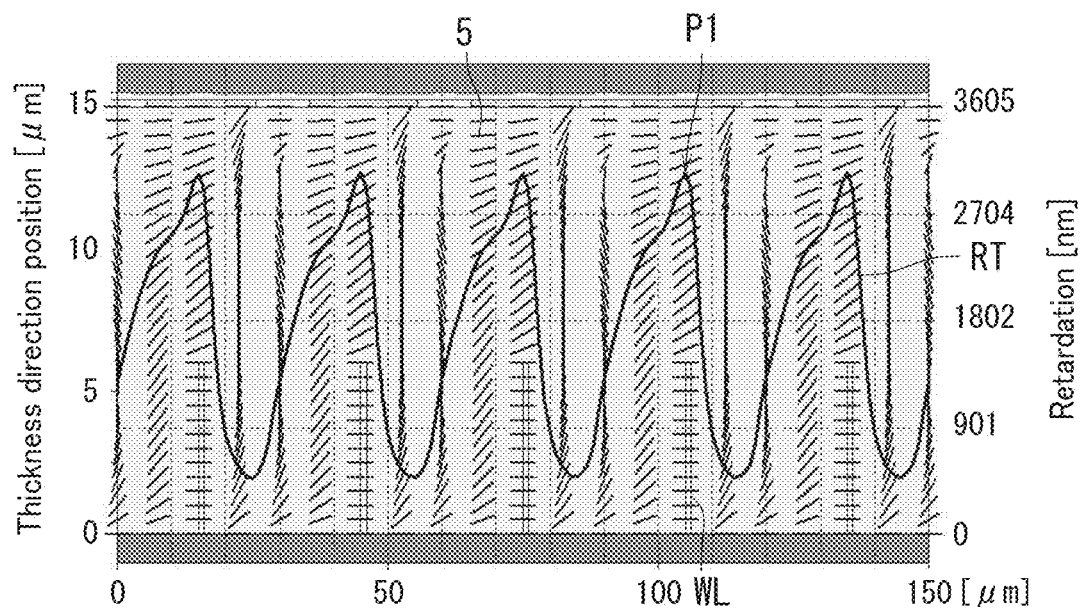
FIG. 34 is a diagram illustrating a retardation of a liquid crystal element including wall members (length of 6 μm from a counter electrode) according to Example 18 of the present invention.

FIG. 34 illustrates the retardation RT of the liquid crystal element 100 according to Example 18. In Example 18, the wall members WL extended from the side of the counter electrode 20 toward the side of the unit electrodes 10 and the length L of the wall members WL was 6 µm. That is, the configuration of the liquid crystal element 100 according to Example 18 was a configuration in which the highly resistive layers 30 illustrated in FIG. 9 were added to the configuration of the liquid crystal element 100E illustrated in FIG. 7.

In the liquid crystal element 100 according to Example 18 as illustrated in FIG. 34, the amplitude difference in the retardation RT was approximately 2600 (nm). Accordingly, even in a case in which the length L of the wall members WL was 6 µm as in Example 18, the amplitude difference in the retardation RT was inhibited from attenuating as compared to Comparative Example 3.

Figure 35:
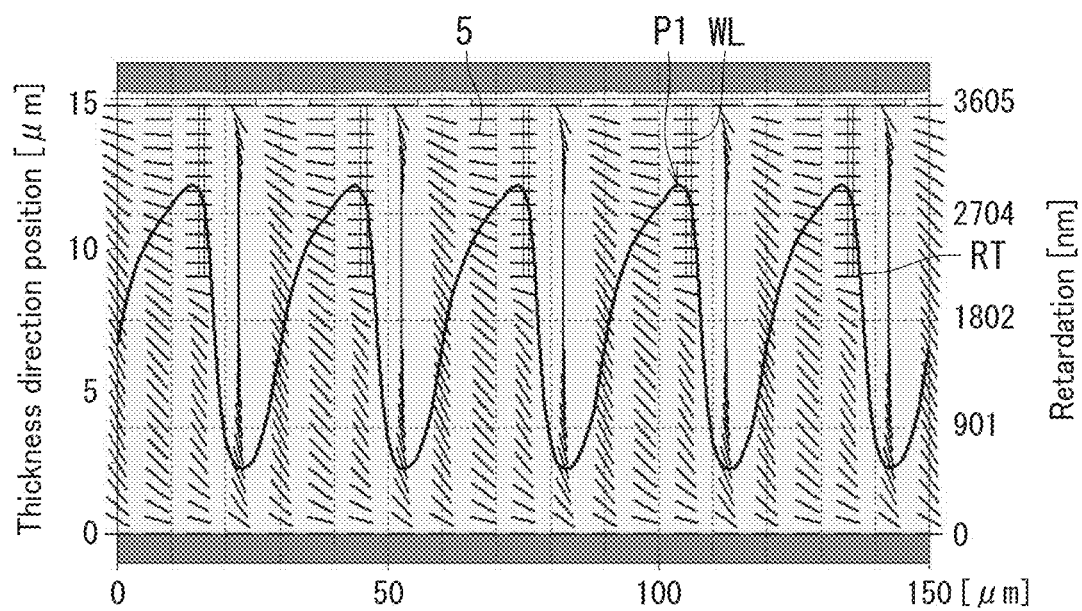
FIG. 35 is a diagram illustrating a retardation of a liquid crystal element including wall members (length of 6 μm from unit electrodes) according to Example 19 of the present invention.

FIG. 35 illustrates the retardation RT of the liquid crystal element 100 according to Example 19. In Example 19, the wall members WL, extended from the side of the unit electrodes 10 toward the side of the counter electrode 20 and the length L of the wall members WL was 6 µm. That is, the configuration of the liquid crystal element 100 according to Example 19 was a configuration in which the highly resistive layers 30 illustrated in FIG. 9 were added to the configuration of the liquid crystal element 100F illustrated in FIG. 8.

In the liquid crystal element 100 according to Example 19 as illustrated in FIG. 35, the amplitude difference in the retardation RT was approximately 2500 (nm). Accordingly, even in a case in which the length of the wall members WL was 6 µm as in Example 19, the amplitude difference in the retardation RT was inhibited from attenuating as compared to Comparative Example 3.

As can be understood from Examples 18 and 19 in FIGS. 34 and 35, it was confirmed that the amplitude difference in the retardation RT can be inhibited from attenuating as compared to Comparative Example 3 independent of the direction in which the wall members WL extend.

Note that even in cases in which the wall members WL were each constituted by a highly resistive material or an electrical conductor, it was easily measured that the amplitude difference in the retardation RT can be inhibited from attenuating as compared to Comparative Example 3 independent of the direction in which the wall members WL extend in the same manner as in Examples 18 and 19. This is because as was made clear from Examples 4 to 6 in FIGS. 19 to 21, the wall members WL inhibited the amplitude difference in the waveform retardation RT from attenuating independent of the electrical resistivity of the wall members WL.

Note that even in a case in which the liquid crystal element 100 did not include the highly resistive layers 30, the following items (1) to (5) was easily measured from the analogy of Examples 4 to 19. This is because the characteristics of the retardation RT of the liquid crystal layer LQ according to each of Examples 1 to 3 without the highly resistive layers 30 were the same as the characteristics of the liquid crystal layer LQ according to each of Examples 4 to 6 with the highly resistive layers 30.

(1) The amplitude difference in the retardation RT can be inhibited from attenuating independent of the relative sizes of the first voltage V1 and the second voltage V2.

(2) By setting the anchoring energy of the wall members WL to at least $1\times10^{-6}$ (J/m$^2$), an adequate amplitude difference in the retardation RT can be ensured. More preferably, the anchoring energy of the wall members WL is set to $1\times10^{-5}$ (J/m$^2$) or greater.

(3) The amplitude difference in the retardation RT can be inhibited from attenuating independent of the positions of the wall members WL.

(4) The amplitude difference in the retardation RT can be inhibited from attenuating independent of the pre-twist angle.

(5) The amplitude difference in the retardation RT can be inhibited from attenuating independent of the direction in which the wall members WL extend.

Concerning Peaks P1 of Waveform Retardation RT

It was confirmed that the positions of the peaks P1 of the waveform retardation RT illustrated by each of FIGS. 14 to 16, 19 to 32, 34, and 35 correspond to the positions of the wall members WL. Specifically, it was confirmed that the peaks P1 of the waveform retardation RT are positioned in the positions of the wall members WL.

Embodiments of the present invention are described above with reference to the accompanying drawings. However, the present invention is not limited to the above embodiments and can be implemented in various manners within a scope not departing from the gist thereof. Furthermore, elements of configuration disclosed in the above embodiments can be appropriately modified. For example, some of all of the elements of configuration illustrated in one of the embodiments may be added to the elements of configuration in another embodiment, or some of all of the elements of configuration illustrated in the embodiments may be removed from any of the embodiments.

Also, the drawings mainly illustrate the elements of configuration schematically to facilitate understanding. Aspects such as thickness, length, number, and interval of the elements of configuration illustrated in the drawings may differ in practice for convenience of drawing preparation. Furthermore, the configuration of each element of configuration illustrated in the above embodiments is one example and not a particular limitation. It need not be stated that the elements of configuration may be variously altered within a scope not substantially departing from the effects of the present invention.

INDUSTRIAL APPLICABILITY

The present invention offers a liquid crystal element and has industrial applicability.

REFERENCE SIGNS LIST

1 First electrode
2 Second electrode
10, rn Unit electrode
20 Counter electrode (electrode)
100, 100A to 100H Liquid crystal element
LQ Liquid crystal layer
WL Wall member

The invention claimed is:

1. A liquid crystal element comprising:
a plurality of unit electrodes each including a first electrode and a second electrode;
a liquid crystal layer to which a voltage is applied from each of the unit electrodes; and
a plurality of wall members arranged in the liquid crystal layer, wherein
the liquid crystal layer has a waveform retardation, and
two or more of a plurality of peaks in the waveform retardation correspond to positions of respective wall members.

2. The liquid crystal element according to claim 1, wherein
the wall members have surfaces constituted by:
a polymer;
a material with a polar element; or
a polymer with a polar element.

3. The liquid crystal element according to claim 1, wherein
directors of liquid crystal molecules making contact with the wall members among liquid crystal molecules constituting the liquid crystal layer are oriented in a direction along an interface of the liquid crystal layer.

4. The liquid crystal element according to claim 1, wherein
the wall members have an anchoring energy of $1\times10^{-6}$ (J/m$^2$) or greater.

5. The liquid crystal element according to claim 1, wherein
the wall members are each opposite to an area between a corresponding first electrode of the first electrodes and a corresponding second electrode of the second electrodes, the corresponding first electrode and the corresponding second electrode constituting a unit electrode of the unit electrodes.

6. The liquid crystal element according to claim 1, wherein
the wall members are each opposite to an area between adjacent unit electrodes of the unit electrodes.

7. The liquid crystal element according to claim 1, wherein
the wall members are each opposite to either a corresponding one of the first electrodes or a corresponding one of the second electrodes.

8. The liquid crystal element according to claim 1, wherein
the wall members extend from a side of one interface to a side of another interface of the liquid crystal layer.

9. The liquid crystal layer according to claim 1, wherein
the unit electrodes are arranged concentrically with respect to an optical axis,
the farther outward in a radial direction from the optical axis a unit electrode of the unit electrodes is positioned, the smaller a width of the unit electrode is, and
the wall members are arranged correspondingly to unit electrodes, of the unit electrodes, positioned outward of a prescribed position in the radial direction.

* * * * *